(12) United States Patent
Ritchey et al.

(10) Patent No.: US 9,344,612 B2
(45) Date of Patent: May 17, 2016

(54) NON-INTERFERENCE FIELD-OF-VIEW SUPPORT APPARATUS FOR A PANORAMIC FACIAL SENSOR

(76) Inventors: Kenneth Ira Ritchey, Leavenworth, KS (US); Kurtis John Ritchey, Leavenworth, KS (US)

(*) Notice: Subject to any disclaimer, the term of this patent is extended or adjusted under 35 U.S.C. 154(b) by 1215 days.

(21) Appl. No.: 13/294,986

(22) Filed: Nov. 11, 2011

(65) Prior Publication Data

US 2012/0113209 A1    May 10, 2012

Related U.S. Application Data

(63) Continuation-in-part of application No. 11/830,637, filed on Jul. 30, 2007, now abandoned, and a continuation-in-part of application No. 11/354,779, filed on Feb. 15, 2006, now abandoned, and a continuation-in-part of application No. 12/266,308, filed on Nov. 6, 2008, now abandoned.

(51) Int. Cl.
| | |
|---|---|
| *H04N 5/225* | (2006.01) |
| *H04N 5/232* | (2006.01) |
| *H04N 7/14* | (2006.01) |
| *H04N 21/43* | (2011.01) |
| *G02B 27/01* | (2006.01) |

(52) U.S. Cl.
CPC ............ *H04N 5/2254* (2013.01); *H04N 5/2259* (2013.01); *H04N 5/23238* (2013.01); *H04N 7/142* (2013.01); *H04N 21/4305* (2013.01); *G02B 27/017* (2013.01); *G02B 2027/014* (2013.01); *G02B 2027/0123* (2013.01); *G02B 2027/0138* (2013.01); *G02B 2027/0156* (2013.01); *G02B 2027/0187* (2013.01); *H04N 2007/145* (2013.01)

(58) Field of Classification Search
CPC .................................................... H04N 5/2254
See application file for complete search history.

(56) References Cited

U.S. PATENT DOCUMENTS

| | | | |
|---|---|---|---|
| 5,023,725 A | 6/1991 | McCutchen | |
| 5,130,794 A | 7/1992 | Ritchey | |
| 5,495,576 A | 2/1996 | Ritchey | |
| 5,815,126 A | 9/1998 | Fan et al. | |
| 5,844,824 A | 12/1998 | Newman et al. | |
| 5,886,735 A | 3/1999 | Bullister | |
| 6,628,338 B1* | 9/2003 | Elberbaum et al. | 348/373 |
| 7,861,985 B2 | 1/2011 | Galvin | |
| 2005/0083248 A1 | 4/2005 | Rolland et al. | |
| 2005/0128286 A1 | 6/2005 | Richards | |
| 2007/0182812 A1* | 8/2007 | Ritchey | 348/36 |
| 2010/0245585 A1 | 9/2010 | Fisher et al. | |
| 2011/0085135 A1 | 4/2011 | Bertolli | |

* cited by examiner

*Primary Examiner* — Sath V Perungavoor
*Assistant Examiner* — James Pontius
(74) *Attorney, Agent, or Firm* — Hovey Williams LLP

(57) ABSTRACT

A support apparatus with adjustable mechanisms hold a spherical field-of-regard image and audio sensor assembly located at its distal end in front of a users face such that the user's fine focus field-of-view of the foreground is not blocked by the mast or the sensor assembly. Automated mechanisms rotate and extend the armature and sensor assembly into position for face-to-face panoramic hands-free video teleconferencing, gaming, or logging. A portable wired or wireless host electronic device with a personal assistant application and sensor correlation system interactively communicates with support apparatus circuitry and servos, imagery, audio, eye and ROI tracking, neural, and user input and feedback systems to orchestrate responses to a local or remote user. A sensor assembly includes a VLSIC multi-ROI processing system with integrated camera and display that hides the assembly and provides information to a user or onlooker.

12 Claims, 22 Drawing Sheets

FIG. 9a.
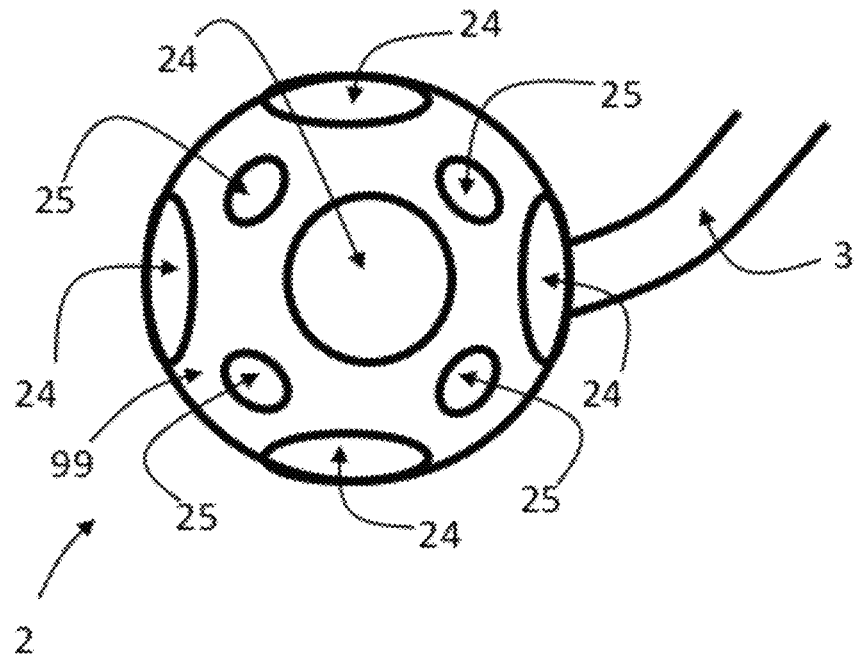
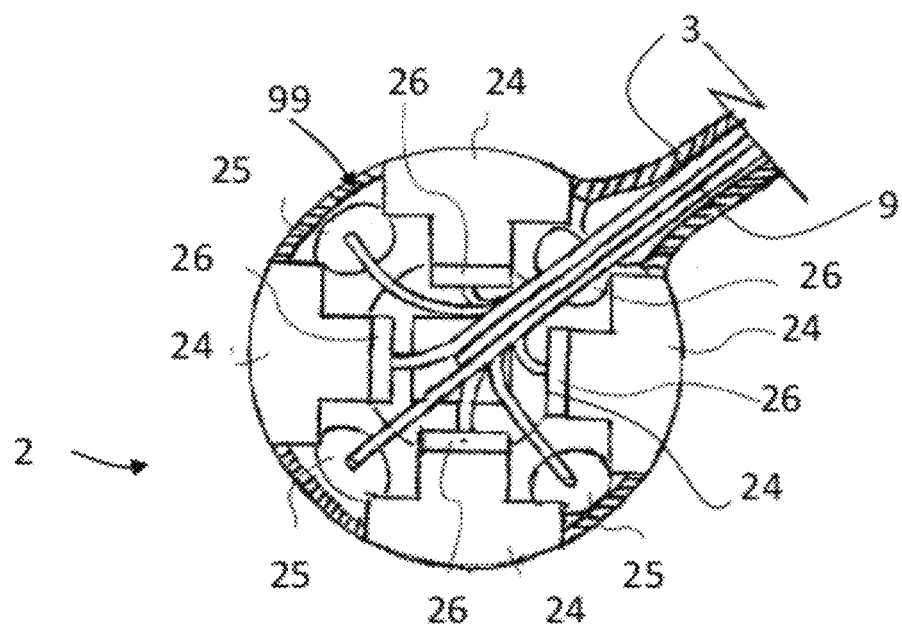
FIG. 9b.

FIG. 10a.
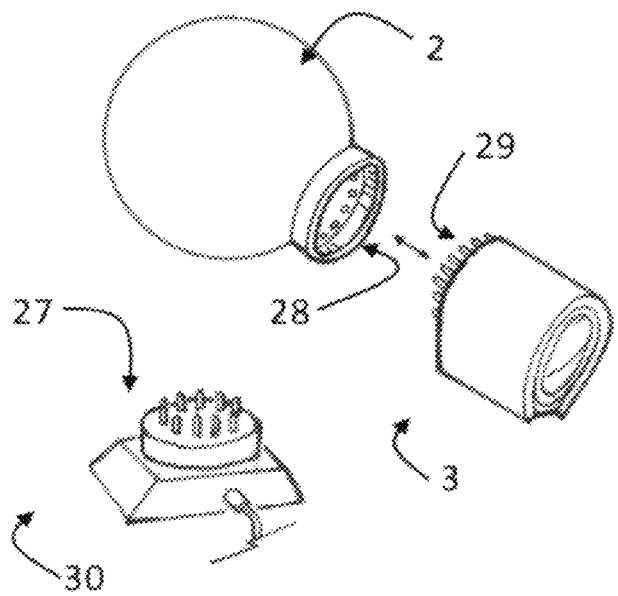
FIG. 10b.
FIG. 10c
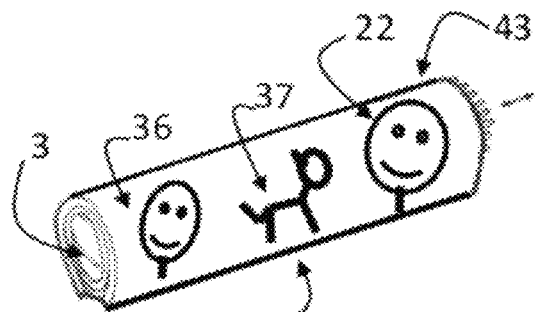
FIG. 11a.
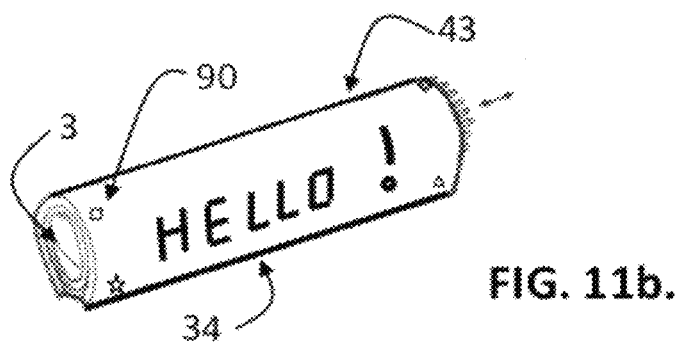
FIG. 11b.

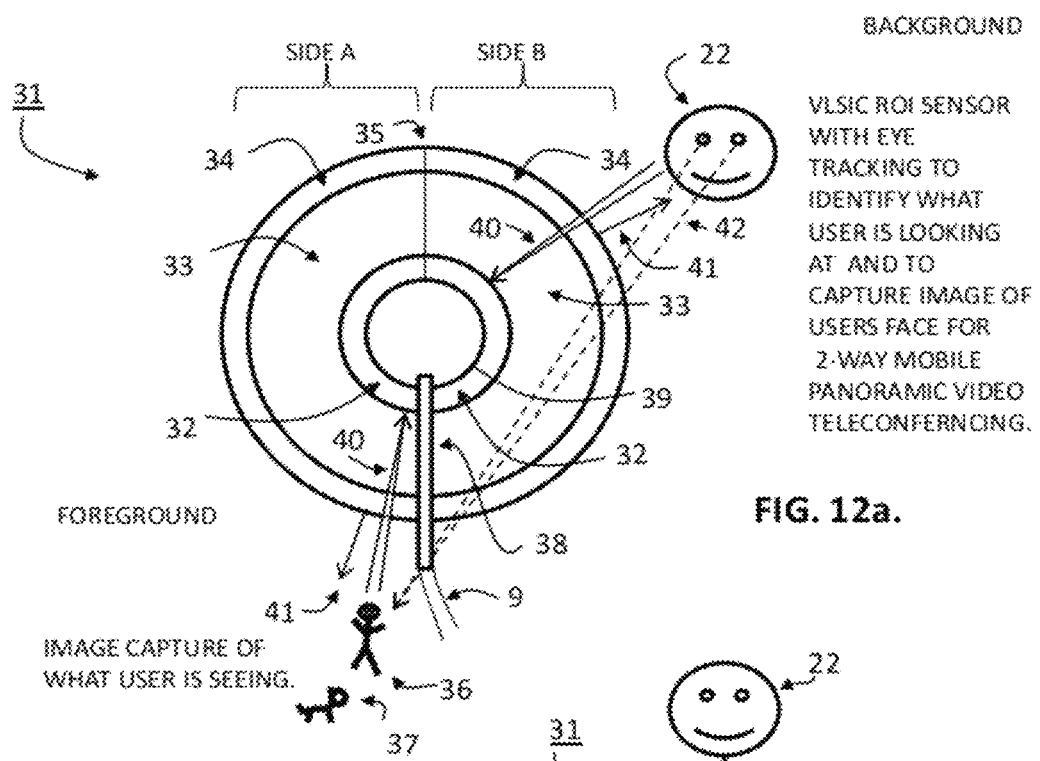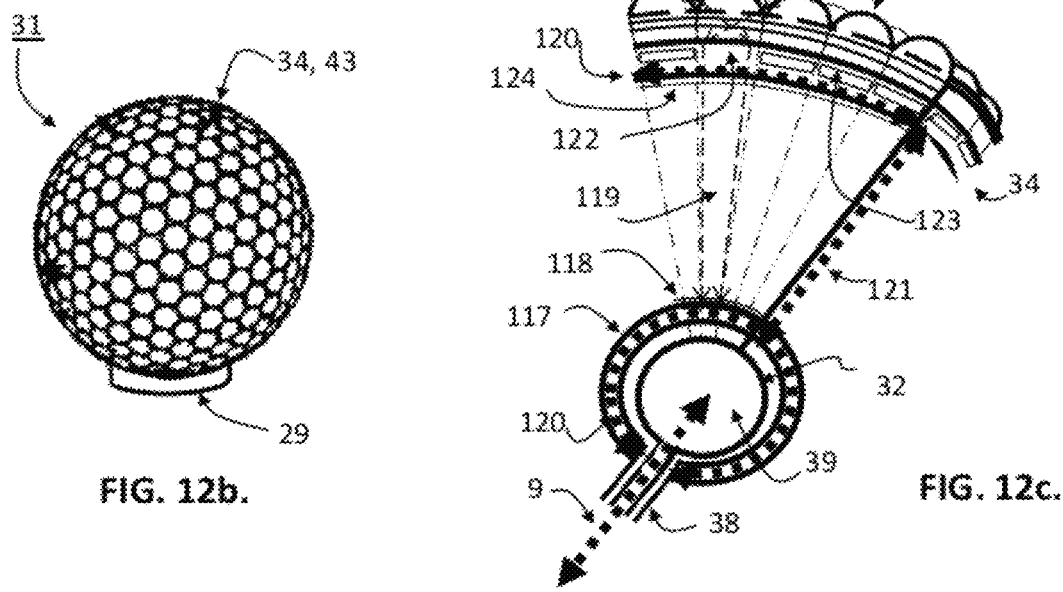

ELECTRO-OPTIC SENSING INWARD

DISPLAY ILLUMINATING OUTWARD

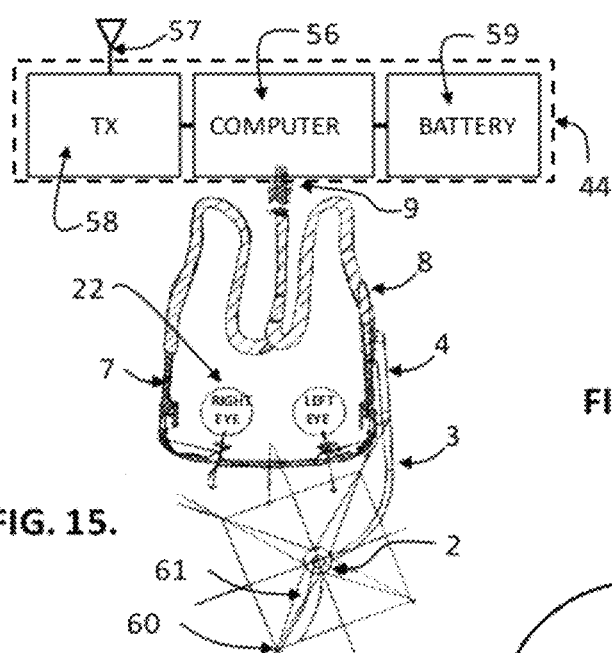
FIG. 15.
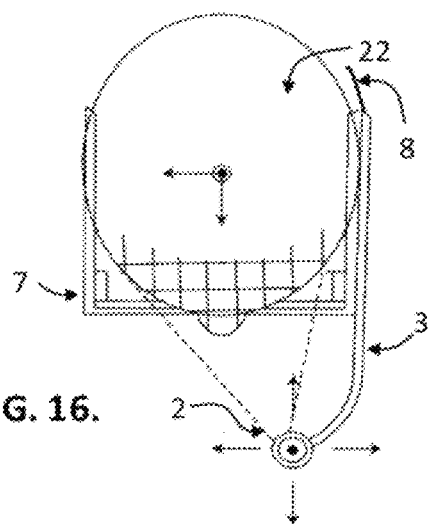
FIG. 16.
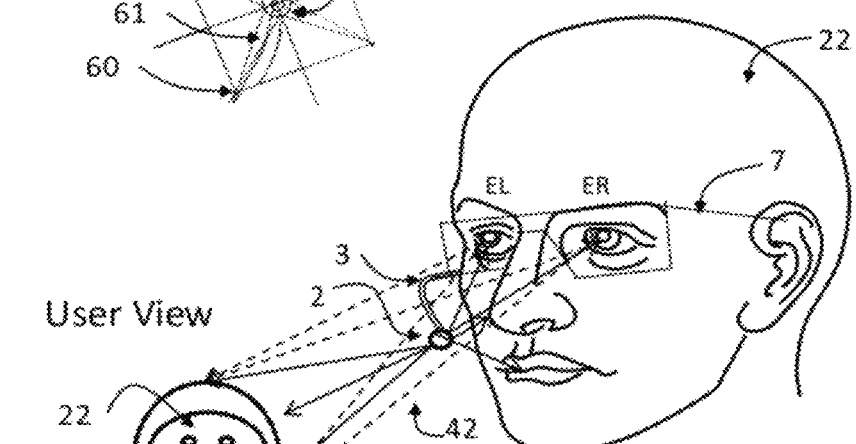
FIG. 17a.
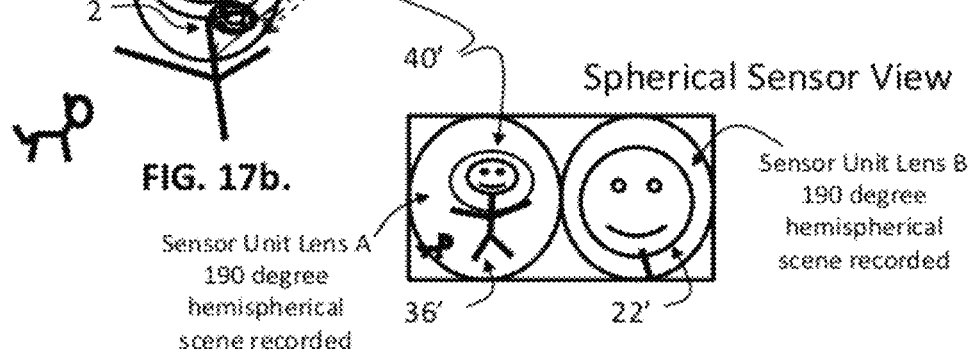
FIG. 17b.
FIG. 17c.

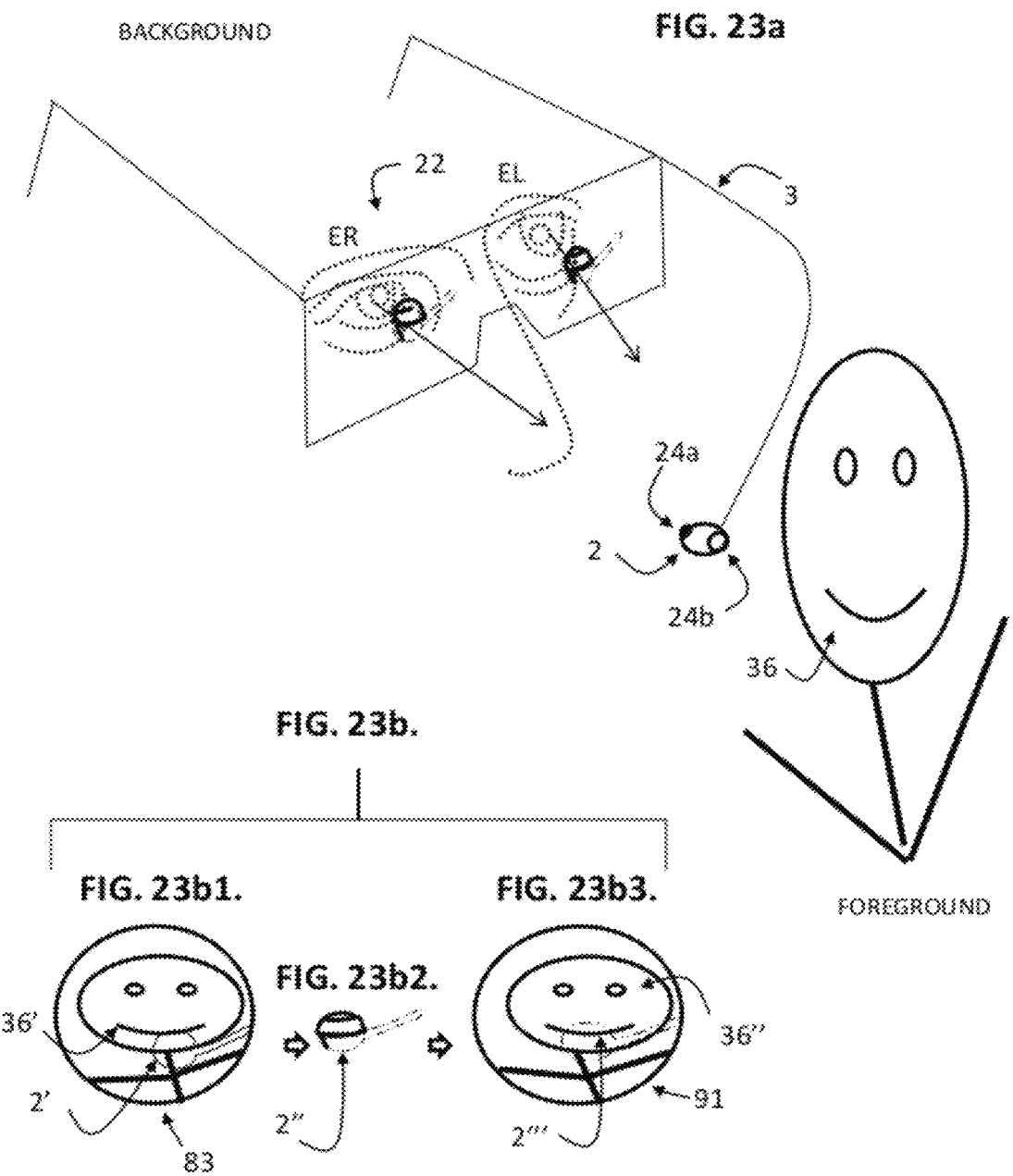

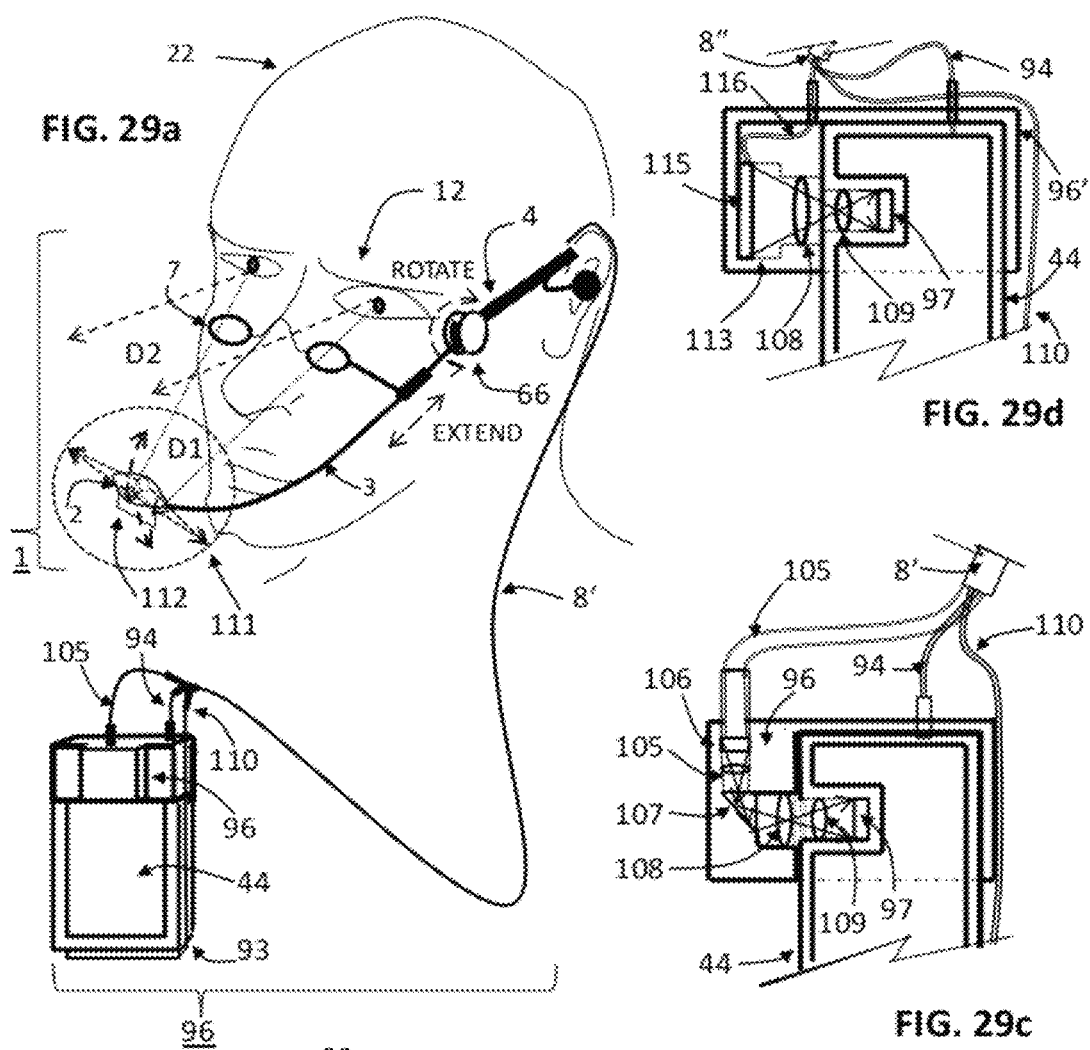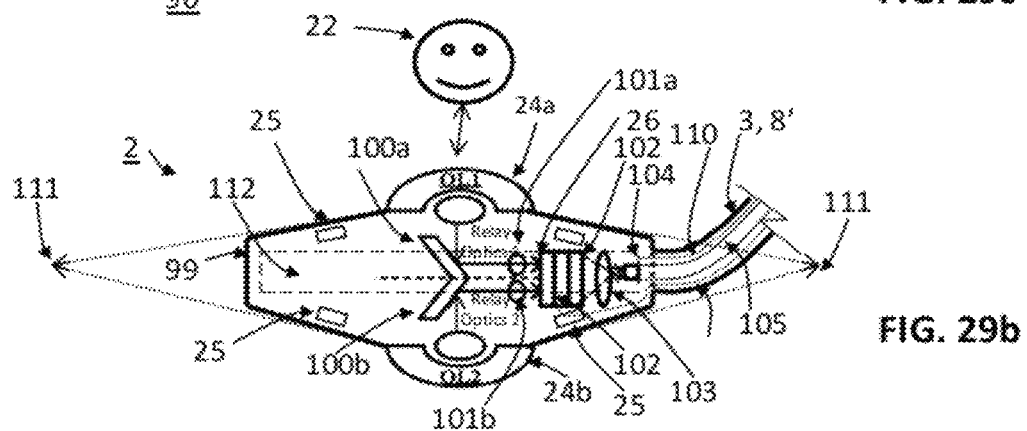

NON-INTERFERENCE FIELD-OF-VIEW SUPPORT APPARATUS FOR A PANORAMIC FACIAL SENSOR

CROSS-REFERENCE TO RELATED APPLICATIONS

This continuation-in-part patent application claims the benefit of, and priority to, all current pending United States Non-Provisional patent applications that specifically includes Ser. No. 11/354,779 filed Feb. 15, 2006 and published as United States Patent Publication No. 2007/0002131 entitled Dynamic Interactive Region-of-Interest Panoramic/Three-Dimensional Immersive Communications System and Method; U.S. patent application Ser. No. 11/830,637 filed Jul. 30, 2005, and published on Jan. 31, 2008 as United States Patent Publication No. 2008/0024594 A1 entitled Panoramic Image-Based Virtual Reality/Telepresence Audio-Visual System and Method; and U.S. patent application Ser. No. 12/266,308 filed Nov. 6, 2007 and published as United States Patent Publication No. 2010/0045773 A1 entitled Panoramic Adapter-System And Method with Spherical Field-of-View Coverage. This continuation-in-part patent application also claims the benefit of the Provisional Patent application by Kenneth I. Ritchey et al entitled Human Environment Life Logging Assistant Virtual Esemplastic Network and System filed 7 Jun. 2011. The above patent applications are hereby incorporated by reference in their entireties into the present application.

BACKGROUND OF THE INVENTION

1. Field of the Invention

The present invention relates to a personal mobile hands free apparatus for holding a spherical field-of-view sensor assembly in place for simultaneous face-to-face and panoramic video teleconferencing and data logging such that the user's fine focus field-of-view of the foreground is not blocked by the facial sensor.

2. Description of the Prior Art

Devices for face-to-face video capture have not been designed to hold a sensor apparatus directly in front of the face of the user without obstructing the user's fine focus field-of-view. Or from keeping the apparatus from obstructing the fine focus field-of-view of a person in front of the user who is looking at the users face. Support apparatus that are related to the present invention but that are parently different from the present invention include: U.S. Pat. No. 5,815,126, by Fan et al., issued 29 Sep. 1998, entitled "Monocular Portable Communication and Display System". A limitation of Fan is that Fan's camera only looks outward from the users head mounted support and does not facilitate face-to-face video teleconferencing. In Fan the controlling host electronic device controls servos that move an armature and display into the fine focus FOV of the user so the user can see the display. In contrast, in the present invention the controlling host device and the support mechanisms move a panoramic camera at the end of the armature out of the fine focus FOV of the eyes so the user can see the scene in front of him or her. Furthermore, U.S. Patent 2005/0083248, by Biocca, Frank and Rolland, Jannick et al., dated 21 Apr. 2005, entitled "Mobile face capture and image processing system and method" disclose a camera with mirror system that only looks inward from the sides of the users face to capture a users face and not outward such that a continuous panoramic view of the remaining surrounding scene can be recorded and interacted with as provided for in the present invention. Another limitation of Biocca is that the head mounted support armature that holds a mirror or a camera blocks the peripheral FOV of the user who is wearing the support device. The purpose and design of Fan and Biocca's invention are distinctly different than the present invention.

Other related Patents and Patent Applications that are distinguishable from the present invention include: U.S. Pat. No. 5,023,725, by McCutchen, dated Jun. 11, 1991, entitled "Method and Apparatus for Dodecahedral Imaging System" presents a handheld spherical FOV imaging system and an associated display system. A limitation of McCutchen is that the hemispherical FOV system is not wireless and is handheld. U.S. Pat. No. 5,130,794 by Kurtis Ritchey, issued 14 Jul. 1992, entitled "Panoramic Image Based Virtual Reality Display System"; U.S. Pat. No. 5,495,576 also by Kurtis Ritchey, issued 27 Feb. 1996, entitled "Panoramic Image Based Virtual Reality/Telepresence Audio-visual System and Method". A limitation of Ritchey is that the sensor assembly is over the user so it does not allow face panoramic teleconferencing; U.S. Pat. No. 5,844,824, by Newman et al., issued 1 Dec. 1998, entitled Hands-free, Portable Computer and System; U.S. Pat. No. 5,886,735 by Edward Bullister, issued 23 Mar. 1999, entitled "Video Telephone Headset"; U.S. Patent 2005/0128286 A1 by Angus Richards, issued 16 Jun. 2005, entitled "VTV System". Richards's presents a head mounted support with a plurality of cameras that only look outward thus negating the ability of the to capture the face of the user wearing his HMD. Additionally, U.S. Patent Application Publication 2010/0245585 A1, by Fisher et. al., dated 30 Sep. 2010, entitled "Headset-based Telecommunications Platform"; U.S. Pat. No. 7,861,985 B2 by Nicolette Galvin, issued 4 Jan. 2011, entitled "Hands-free Device Holder for Securing Handheld Portable Electronic Device with a Screen"; U.S. Patent Application Publication 2011/0085135 A1 by Eugene Bertolli, dated 14 Apr. 2011, entitled "Free Space Hands Free Ocular Observation Camera Mount".

SUMMARY OF THE INVENTION a. General Idea of the Claimed Invention

The present invention is directed at a providing a personal mobile hands-free support apparatus with an adjustable armature and extension mechanism positions and holds a spherical field-of-view image and audio sensor assembly located at its distal end in front of a users face such that the user's fine focus field-of-view of the foreground is not blocked by the mast or the sensor assembly is provided. Manual or automated mechanisms rotate and extend the armature with assembly into position for mobile face-to-face panoramic hands-free video teleconferencing or logging. The portable host electronic device, such as a personal digital assistant or cell phone, communicates with the apparatus circuitry, servos, spherical image sensor, audio system, eye and head tracking, and other optional sensor systems to interactively and in an automated manner command and control the apparatus to hide and reduce the visual presence of the sensor assembly in front of the users face for the user and to onlookers in front of the user. Optionally, in several embodiments of the invention a display is mounted on the armature and sensor assembly to hide and conceal the sensor assembly and armature and to provide audio-visual information to the wearer of the apparatus.

b. Objective of the Invention

There is a continuing need to capture a frontal view of the users face while the user is on the move so that the user can conduct mobile video teleconferences. There is also a need for the audience at the far end of the teleconference to see what the user is looking at or look independently at the environment the user is occupying. There is also a need to provide a device that allows portable hands-free interaction with a portable digital device, like a PDA or cell phone. There is also a need to record the user's facial reaction to events while simultaneously recording events taking place in the environment the user is occupying. There is also a need for a support device with a portable facial sensor that is responsive to automated wake up features of a portable device. There is also a need for a support device with a facial sensor located directly in front of the face of user that automatically positions itself to in response to the field-of-view and focus of the eyes of the user. There is also a need for a device that masks the device in front of the users face from the user and onlookers. There is also a need to provide a support device that does not block the peripheral view of the user wearing the support device. There is also a need to provide a support device that has a video sensor that has enough stand-off distance such that the device captures the entire face of the user. There is also a need for a support device that automatically accommodates a video display device at a stand-off distance that positions itself in response to the field-of-view and focus of the user as defined by sensors, like an eye tracking system, that are worn by the user. There is also a need for a portable hands-free support device that facilitates interaction with a wearable sensor assembly with audio-visual capture capabilities and an integrated display such that the camera and display are concealed. There is also a need to provide a support device simultaneously responsive to the both the users neural, sub-vocal, visual, and audio sensors and signatures and the surrounding environment audio-visual sensors and signatures integrated with the support device. There is also a need for a support device that facilitates presentation to the user that preserves the apparent distances and the relationship between the accommodation and convergence of content presented to the user. There is also a need to provide a VLSIC panoramic sensor for a portable hands free support device with reduced volume for two-way telepresence. There is also a need to provide a hands-free support device with body sensors and panoramic environmental sensors that integrate with a portable electronic device with processing capabilities that filter and converge sensor signatures of the supported sensors and peripheral devices. There is a need to provide a support device that is integrated with devices that are part of and connected to a telecommunications system and network. There is a need to connect this system to a cloud computing system that is part of a local area network (LAN) or wide area network (WAN) in order to log this information for educational, entertainment, security, health care, and other applications in which the reaction of the user to the surrounding environment needs to be monitored or documented. And there is also a need to provide a device that is integrated with various peripheral devices such as mobile electronic device such as a personal digital assistant or cellular telephone, a voice recognition system, facial analysis system, sub-vocal recognition system, or brain activity sensor. It is an objective of the present invention to address these above needs.

BRIEF DESCRIPTION OF DRAWINGS

FIG. 9a is a perspective drawing of the exterior of the spherical sensor with a plurality of objective lenses and microphones of the present invention.

FIG. 9b is a side sectional drawing showing the interior of the spherical sensor attached to the support armature of the present invention.

FIG. 10a is the sensor with male plugs that plugs into either the armature or the recharging assembly.

FIG. 10b is the armature with female sockets that accepts the sensor in FIG. 10a.

FIG. 10c is a recharging assembly with female sockets that accept the sensor in FIG. 10a.

FIG. 11a is an exterior perspective of a portion of the armature with a LED display with images displayed.

FIG. 11b is an exterior perspective of a portion of the armature with a LED display with text displayed.

FIG. 12a is a diagrammatic side sectional drawing of a VLSIC spherical sensor assembly with imaging and display capabilities for use in the present invention.

FIG. 12b is an exterior perspective of a VLSIC spherical sensor assembly shown in FIG. 12a for use in the present invention.

FIG. 12c is enlarged side sectional drawing of a portion of the VLSIC spherical sensor described in FIG. 12a. Sensor also including imaging and display capabilities according to the present invention.

FIG. 14a is a side sectional view of the embodiment shown in FIG. 14a which includes an integrated camera and display used on the sensor assembly according to the present invention showing the image display phase of the system.

FIG. 15 is a diagrammatic plan view of the invention mounted to augmented reality eyeglasses and a computer and illustrating the panoramic view of the sensor.

FIG. 16 is a plan view of the invention mounted to a users head illustrating the field of coverage of the panoramic sensor to the users face when in lowered to the forward position.

FIG. 17a-c is a perspective view of the eye-tracking embodiment of the invention.

FIG. 23a is diagrammatic perspective illustrates insertion of a portion of the foreground imagery captured by the panoramic sensor between the user and the sensor and armature to facilitate an uninterrupted view by the user of the foreground scene.

FIG. 23b1-3 is a diagrammatic perspective that graphically illustrates the basic steps in image processing and display that occurs to prepare a portion of the panoramic scene to be overlaid to hide the sensor from the users FOV.

FIG. 29a is a perspective illustration of an alternative embodiment that incorporated fiber optic image conduits to deliver a panoramic image from a sensor assembly to the camera of a portable wireless device for face-to-face panoramic video teleconferencing according to the present invention.

FIG. 29b is a side sectional view of a sensor assembly with a small display screen shown in FIG. 29a.

FIG. 29c is a side sectional view of an adapter for receiving and focusing an image onto the image sensor of the portable electronic device, like an iPhone, shown in FIG. 29a.

FIG. 29d is a side sectional view of an alternative embodiment of the adapter assembly shown in FIG. 29a in which at least one CMOS image sensor in the sensor assembly transmits and image signal over a cable to the adapter with at least one display for projection onto the camera sensor of the portable electronic device.

FIG. 30a illustrates an embodiment in which the invention is integrated into an electronic communication device entirely worn on the users head.

FIG. 30b illustrates an embodiment of the invention in which the sensor support is integrated into a hat.

FIG. 30c illustrates an embodiment of the invention in where the armature with panoramic sensor assembly flips up from the belt of a user.

FIG. 30d illustrates an embodiment of the invention in which the sensor is unplugged from the mast and used remotely.

DETAILED DESCRIPTION OF THE INVENTION

Figure 1:
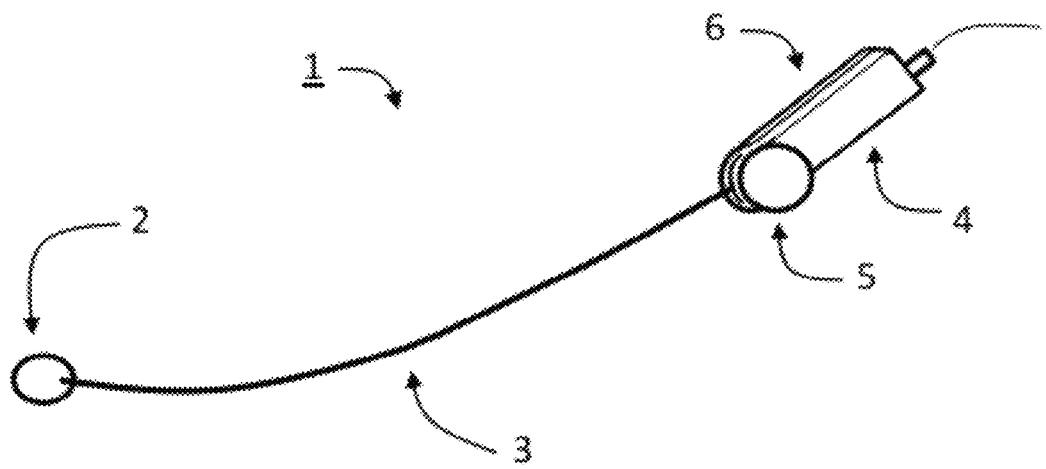
FIG. 1 is a front perspective view of a non-interference field-of-view support device for facial sensor that comprises a first embodiment of the present invention.

FIG. 1 is a perspective view of a first support apparatus 1 for holding a spherical field-of-coverage image and audio sensor assembly 2 in place according to the present invention. The sensor assembly is held securely in place on the distal end of a support armature 3. Typically the sensor assembly is located at the distal end of the supported armature. But optionally the sensor assembly may be integrated to be all along the armature. The armature consists of a group of insulated metal conductive wires that send and receive data to and from the sensor assembly to a host electronic device 44 such as a personal digital assistant (PDA) with wireless video cellular telephone functionality. A personal digital assistant, also known as a palmtop computer, or personal data assistant, is a mobile device that functions as a personal information manager. Current PDAs often have the ability to connect to the Internet. A PDA has an electronic visual display, enabling it to include a web browser, but some newer models also have audio capabilities, enabling them to be used as mobile phones or portable media players. Many PDAs can access the Internet, intranets or extranets via Wi-Fi or Wireless Wide Area Networks. Many PDAs employ touchscreen technology. The sensor assembly housing is 14 millimeter in diameter and spherically shaped. The housing holds all components of the sensor assembly 2 in place. The armature is constructed of a four millimeter diameter rigid wire 21 made of metal that is 25 centimeters in length. The wire 21 is insulated by insulating material 23 from conducting data communication wires 9. The armature is curved at the distal end with a bend radius of ninety degrees for every 12 centimeters. This places the sensor assembly forward of the face of the user. The proximal end of the armature is held into place by a clamp located in an armature support housing 4. The support housing includes a swivel assembly 5 comprising a hinge and socket that connects to an adjacent support structure 6. The swivel is tensioned by a lock nut and washers such that when the housing 4 is manually rotated into position for hands-free use by a user the housing stops in a position desired by the user of the device apparatus 1.

Figure 2:
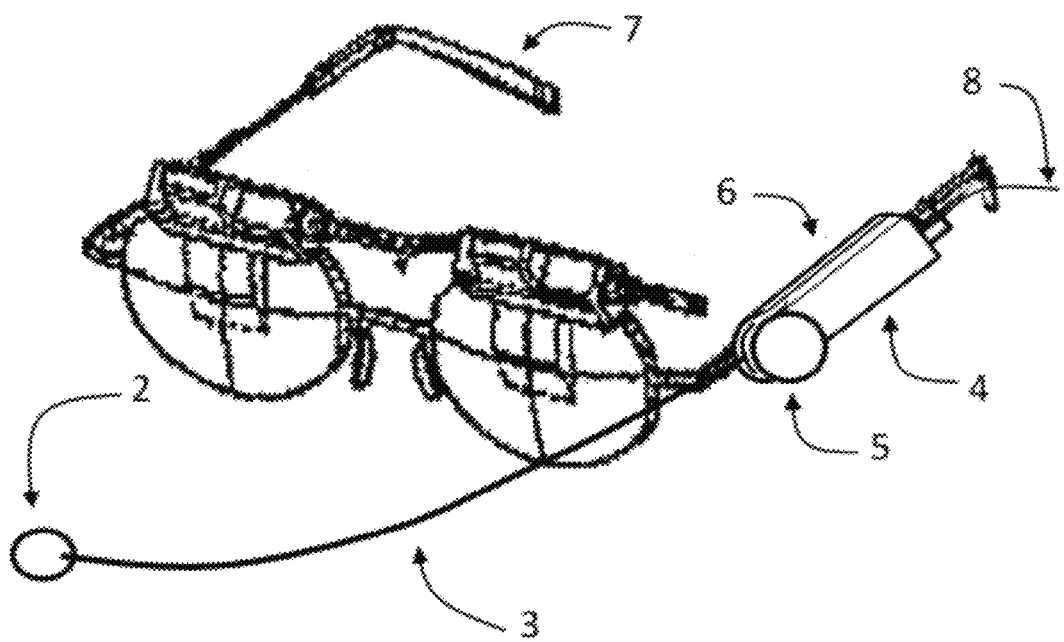
FIG. 2 is a front perspective view of the first embodiment of the present invention in which the support device is mounted to eyeglasses.
Figure 3:
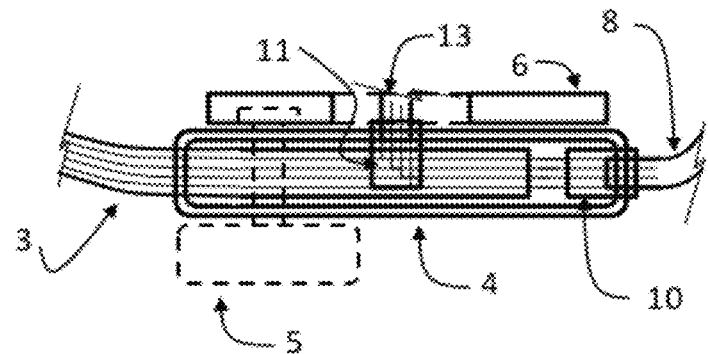
FIG. 3 is an enlarged top sectional view of the armature support housing of the first embodiment of the invention.

The adjacent support structure 6 includes a fastener that is mounted to a head worn support 7, such as the eyeglass frames shown in FIG. 2. Wiring running from the assembly 2, through the armature 3, and into the housing 4 continues onward through a flexible cable 8 that runs to a host electronic device. FIG. 3 shows and interior section 3-3 of the housing in FIG. 4. As shown in sectional view of FIG. 3 the bundled insulated conductive wires 9 that comprise the semi-flexible armature 3 are broken out and joined by connecting pins of a connector jack 10 to corresponding wires that comprise a flexible cable 8 that exits the housing 4. The cable 8 runs from the housing to a mini jack which plugs into a host electronic device 44 with face-to-face panoramic video teleconferencing capability. A second connector 11 is included in the support housing 4 to accept electrical signal input and output to an eye tracking sensor 12 shown in FIG. 4. Data from the eye tracking sensor 12 is transmitted through a eye tracking cable 13, connector 11, housing 4, connector 10, and through cable 8 to a host electronic device 44. Finally, it should be noted that tracking sensor 12 and sensor assembly 2 may incorporate infrared or visible sensors to assist in tracking the pupils of the eyes of the user.

Figure 5:
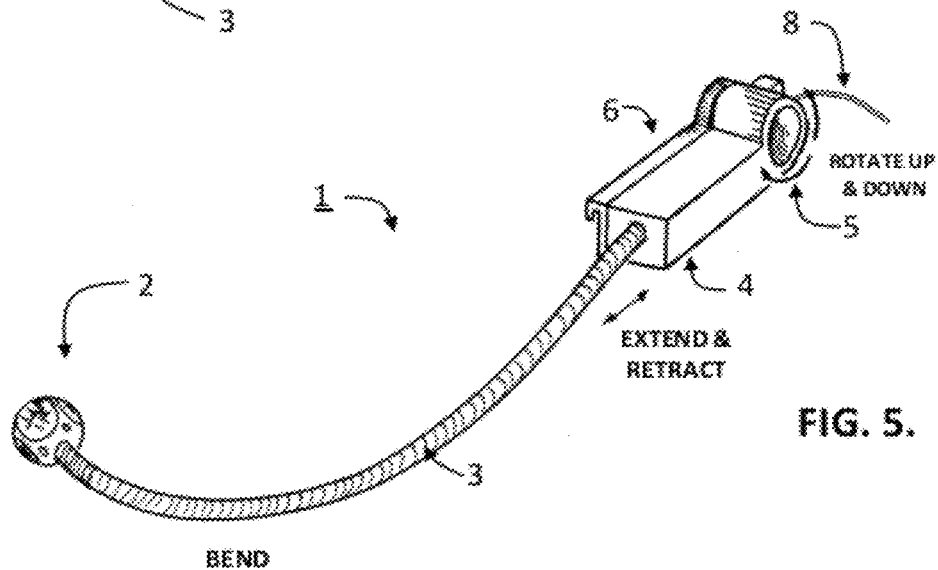
FIG. 5 is a perspective view of a second embodiment of the invention which incorporates a semi-rigid bendable gooseneck armature.

FIG. 5 is a perspective view of a second embodiment of the support device apparatus 1 for holding a spherical field-of-coverage image and audio sensor assembly 2 in place according to the present invention. The armature comprises a flexible gooseneck material well known to those in the lighting and borescope industry. Wiring running from the sensor 2, through the hollow stem of the gooseneck armature 3, and into the support housing 4 continues onward through a flexible cable 8 that runs to a host electronic device. The support housing 4 includes a mechanism that raises and lowers the armature 3 and sensor assembly 2. Designation A1 indicate the rotational direction of the motorized hinge. Designation A2 indicates the direction of the armature extension. The range of the extension will typically vary between 15.24 centimeters to 30.48 centimeters to accommodate the eyes of the user at a comfortable in focus reading distance. Those skilled in the art will realize there are numerous types of miniature actuators and small electric motorized servos in the industry that may be incorporated into the present invention. And additionally, that the motors may even be radio-controlled by a cellular phone. Additionally, different types of motorized gooseneck, rigid rod, hollow tube, or telescoping extensions be used in the present invention without departing from the spirit of the invention.

Figure 6A:
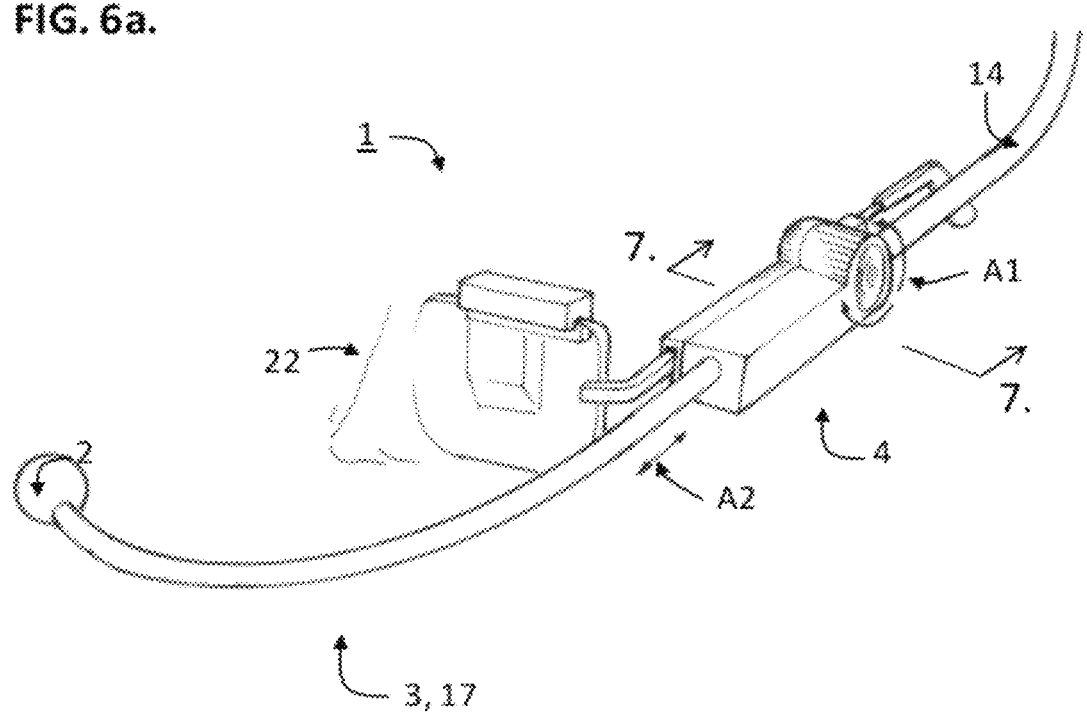
FIG. 6a is a front perspective view of a third embodiment in which the armature and sensor assembly are covered with a LED display covering that conceals the armature and sensor assembly to the user and adjacent personnel.
Figure 6B:
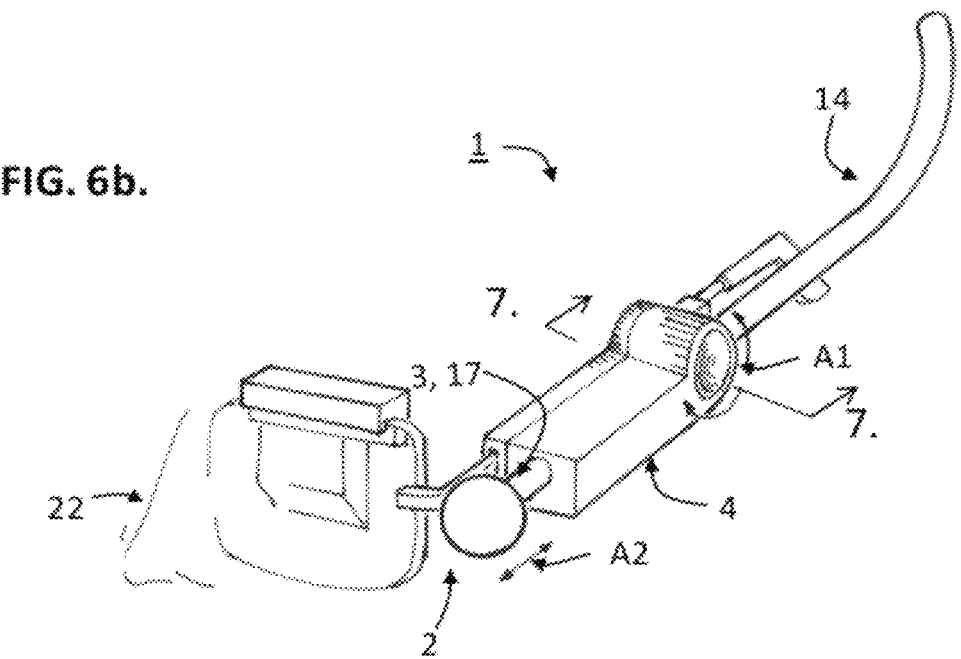
FIG. 6b is a front perspective view of the third embodiment of the invention in which the armature and sensor assembly are in a solved position.

In addition to the functionality shown in FIG. 5, FIG. 6a-6b are perspective views of a third embodiment of the support device apparatus 1 in which the support housing 4 includes a mechanism that extends and retracts the armature 3 and sensor 2 forward and backwards as indicated by the arrows A2. Arrows A2 indicate the extension and retraction direction of the armature and sensor. FIG. 6a shows the armature in the extended position. FIG. 6b shows the armature in the retracted position. In the retracted position the proximal end of the armature 3 is stowed in a protective extension tube 14 that is constructed into and integrated with the armature support housing 4. The tube may be configured to wrap around the back of the head of the user in order to assist in holding the support device apparatus 1. The proximal end of the armature extends into the housing and may extend out of the back side of the housing when the armature is retraced. The proximal end of the armature is held tight when extended by a tensioned springs in the housing that push against the armature that penetrates into the housing. The armature has a rear hinge that keeps the proximal end of the armature from being pulled out of the housing. The cable has slack to allow it to be extended. Alternatively, the cable is on a spindle that reels the cable up when retracted and reels out when extended.

Figure 7:
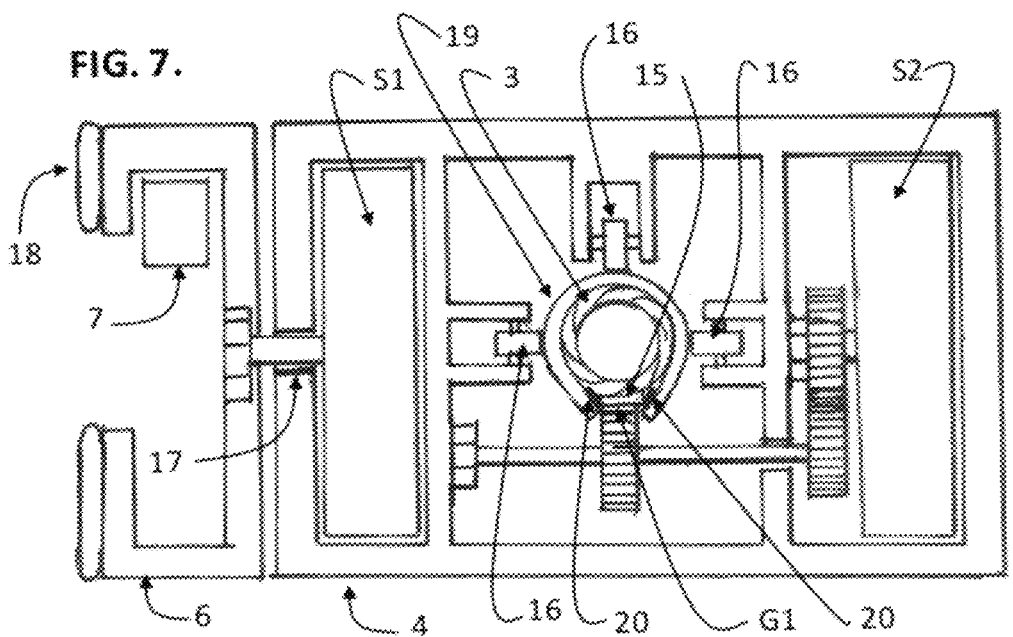
FIG. 7 is a side sectional view of the mechanism used to extend and retract the sensor assembly and armature.

FIG. 7 is a side sectional view 7-7 of FIG. 6a-6b of the mechanisms in the armature support housing 4 used to extend and retract the armature 3. In this embodiment the armature support housing 4 is a hollow rectangular shaped housing which includes a first servo S1 for raising and lowering the armature. A shaft 17 of the servo runs from the armature support housing 4 through a socket to the adjacent support structure 6. Support structure 6 is attached to the eyeglasses frame 7 in an anchored manner. When the servo is commanded electronically the torque raises or lowers the armature support housing 4 by a commanded interval. The interval is determined by how long the current is applied. The direction of the servo rotation is determined by direction of the current applied to the reversible motor servo. Similarly, a second servo S2 is operated bi-directionally to extend and retract the armature. The second servo turns a set of shafts and gears that move the armature. On one side of the armature a flexible rubber indented track 15 is attached. The indented track engages a gear G1 which moves the indented track with the attached armature 3 forward and backward by a commanded interval. Once again the interval is determined by how long the current is applied. And once again the direction of the servo S2 rotation is determined by direction of the electrical current applied to the reversible motor servo. A miniature stepper, brushless, pancake DC or PWM motors may be used in the present invention because they may be battery controlled, are compact, and are responsive to precision control applications. A miniature series-wound motor referred to as a universal motor designed to operate on either AC or DC power may be incorporated. The armature is held in place on the track 15 by a plurality of spring tensioned rubber wheels 16 that apply pressure to the sides of the armature 3 by equal amounts at intervals facing inward to the armature internally throughout the armature support housing 4. Optionally, the rubber wheels apply pressure to the sides of a display 19, here an electronic paper LED or OLED display is incorporated that covers at least some portion of the armature 3. A flexible color display of a type that may be incorporated into the display of the present invention is manufactured by Philips Research Laboratories, Endhoven, The Netherlands, disclosed at the Society for Information Display Symposium, Session 16: Flexible Displays, May 25-27, 2004, Seattle, Wash., USA by P. Slikkerveer. Referred to as "e-paper" displays they may be rolled and folded slightly, are three times the thickness of paper, are light weight, and can be manufactured so that the image can cause the display to be opaque or allow a see through capability. Electrical power, command and control signals to drive the display 19 are introduced by electrical contacts 20 located along the sides of the track in the present embodiment of the invention. Electrical wires and circuitry are provided to connect and power electrical components located in the armature support housing. Electrical power and control signals to the servos S1 and S2 are provided by host electronic device. Alternatively, a battery and electronics to drive servos may be included in the mechanized armature support housing 4. An ear pad 18 is attached to the adjacent support structure 6. The ear pad 18 cushions the head of the user should the users head come in contact with structure 6.

Figure 8A:
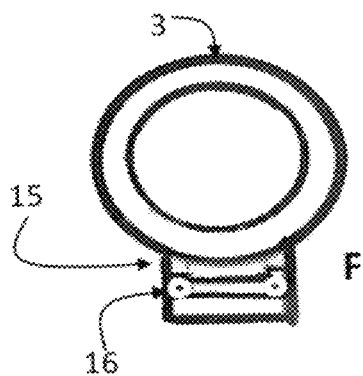
FIG. 8a is an enlarged sectional view of a gooseneck armature with an attached rubber track.
Figure 8B:
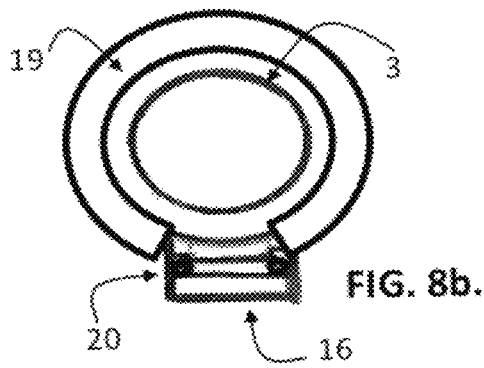
FIG. 8b is a further enlarged sectional view of a gooseneck armature with an attached rubber track like the one shown in FIG. 10.
Figure 8C:
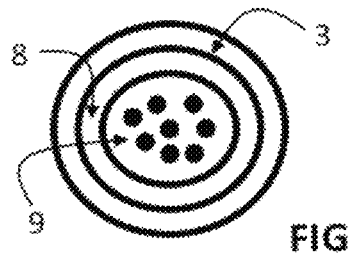
FIG. 8c is an enlarged sectional view of the armature comprising a cable within which a plurality of insulated wire conductors carry communication signals to and from the spherical sensor.
Figure 8D:
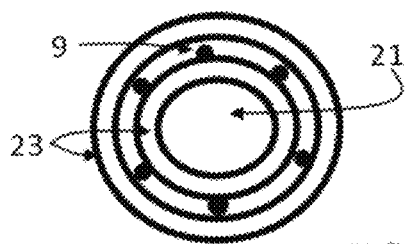
FIG. 8d is an enlarged sectional view of the armature comprising a solid core semi-flexible wire wrapped in insulation, then conducting wires that run to and from the sensor, and then an insulated covering.

FIG. 8a-d are enlarged sectional embodiments of various armature 3 designs that may be used to realize various embodiments of the present invention that correspond to the same direction as FIG. 6a-6b cutline 7-7. FIG. 8a is an enlarged sectional view of a gooseneck armature 3 with an attached rubber track like that described in FIG. 7. FIG. 8b is a further enlarged sectional view of a gooseneck armature with an attached rubber track like the one shown in FIG. 7. FIG. 8c is an enlarged sectional view of the armature comprising a cable within which a plurality of insulated conductor wires 8 carry signals to and from the spherical sensor. FIG. 8d is an enlarged sectional view of the armature comprising a solid core semi-flexible wire wrapped in insulation, then conducting wires that run to and from the sensor, and then an insulated covering. Optionally, a flexible cable 8 may be run through the inner tube of the gooseneck armature. The servo that extends and retracts the armature may include a spindle in the housing to reel in and reel out the cable. This actuation is done in synchronization with armature extension and extraction. Also alternatively, the armature may be bent or shaped to come up at the lower side of the face of the user so that the armature does not significantly block the peripheral FOV of the user.

FIG. 9a is a perspective drawing of the exterior of the spherical sensor 2 with a plurality of objective lenses 24 and microphones 25 of the present invention. The objective lens systems comprise six equally spaced fisheye lenses with a field-of-view (FOV) of 190 degrees faced outward from the center point of the spherical shaped housing. Stereoscopic FOV coverage may be sampled from the imagery using computer processing for stereoscopic viewing. Alternatively, bioccular and monoscopic imagery may be sampled out for viewing using lenses with a greater than 180 degree FOV or at least with lenses with greater than a 180 degree FOV. Alternatively, a non-uniform fiber optic image conduit bundle arrangement known by the trade name "fibereye" to reduce or remove image distortion may be incorporated between objective lens and the sensor array 26. FIG. 9b is a side sectional drawing showing the interior of the spherical sensor attached to the support armature of the present invention. A curved light sensitive recording array 26 is incorporated into the present invention. The CMOS sensor incorporated has multiple Region of Interest (ROI) tracking and readout capability. A type of ROI sensor compatible with an incorporated into the present invention is disclosed in co-pending US Patent Application Publication 2007/0021 31 A1, by Ritchey, dated 4 Jan. 2007, entitled "Dynamic Interactive Region-of-Interest Panoramic/Three-Dimensional Immersive Communications System and Method". It will be obvious to those skilled in the art that either CMOS, CCD, or light sensitive recording devices with a ROI sampling capability may be used in the present invention. Stereoscopic cameras that approximate human vision are preferable because they reflect how humans naturally see the world and provide depth clues to the brain. And panoramic stereoscopic cameras are even more preferable because they add a spatial awareness and allow the replay of the total surrounding environment stimulating the users senses, memories, and resulting thoughts. Portable head-mounted (HM) panoramic video cameras of a type that may be used in the present invention include U.S. Pat. No. 6,552,744 B2 by Chen, dated Apr. 22, 2003, entitled Virtual Reality Camera which presents a camera which records discrete still or video images that can be stitched together to create a panoramic scene that incorporates computer processing so that the user may pan and zoom around the panoramic scene. And U.S. Patent Application 2001/00105555 and U.S. Pat. No. 6,539,547, by Driscoll, dated Aug. 2, 2001, discloses a Method and Apparatus for electronically recording, storing, and distributing panoramic images from a panoptic camera system to a remote location using the internet. And U.S. Patent Publication 2005/0157166 by Peleg, dated Jul. 21, 2005 entitled Digitally Enhanced Depth Image which discloses a camera method to simultaneously record, store, and process panoramic stereoscopic imagery. However, use of apparatus 1 and it's embodiments with the above prior art is unobvious, novel, and useful.

FIG. 10a is a perspective drawing illustrating an alternative sensor assembly 2 arrangement. A plurality of male posts 27 plug into associated female holes 28 of a socket 29 in either the armature 3 or the recharging assembly 30. Alternatively the recharging assembly can operate independently of the armature assembly when connected to any host digital device, such as a computer with panoramic video teleconferencing software or firmware. FIG. 10b is the armature with female sockets that accepts the sensor in FIG. 10a. FIG. 10c is a recharging assembly with female sockets that accept the sensor in FIG. 10a. Alternatively, the sensor assembly and armature are one in the same shape. For Instance the sensor assembly and armature are an elongated round tube or rectangular box that extends from the support housing. In such an instance, the microphones and optics are placed on each side of the elongated assemblage to provide a continuous panoramic FOV coverage that includes facial coverage of the user.

Figure 25:
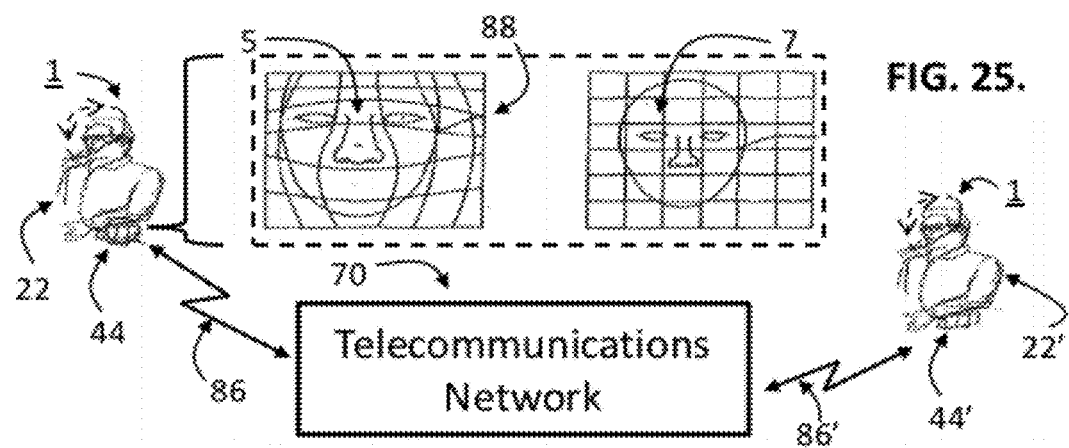
FIG. 25 is a diagrammatic representation of a two-way teleconference enabled by users of the present invention.

FIG. 11a is a side sectional drawing of a volumetric Very Large Scale Integrated Circuit (VLSIC) spherical sensor assembly 31 ideally suited for use in the present invention. Sensor assembly 31 is substituted for sensor assembly 2 in the present embodiment of the invention. Sensor assembly 31 includes on board panoramic image processing and display functionality. The circuit includes region-of-interest processing, distortion removal means, and image stitching means, scaling, read out and in means, communications transmission means, electrical power means, and cooling means. The sensor is driven by a local or remote user sending x-y-z coordinate pan and zoom information to the sensor. In operation a user head mounted display assembly with position sensing and eye tracking outputs coordinate yaw, pitch, and roll, pan, and zoom data to the VLSIC that defines the scene to be sampled by the ROI portion of the VLSIC. The positional data defined is operated upon by the VLSIC to define the ROI output for display to a user. The user will typically be a remotely located user of the system who wants to pan and zoom around the panoramic scene of a user who is or was wearing device apparatus 1 in another location as depicted in FIG. 25.

In FIG. 11a the VLSIC sensor 32 comprises an inner silicon chip material on which and throughout which microcircuitry that forms the VLSIC is imprinted. The VLSIC circuitry includes a field programmable gate array integrated ROI image processing capabilities. The exterior of the VLSIC is a continuous CCD or CMOS sensor whose light sensitive elements are distributed across the outward surface of the VLSIC. Integrated and adjacent to the curved light sensitive surface of the VLSIC is the curved inner concave shaped portion of the fisheye lens 33 such that subjects imaged by the fisheye are projected onto the light sensitive surface of the VLSIC 32. Integrated over and adjacent the outer surface of the fisheye lens is an addressable transparent Organic Light-Emitting Diode (OLED) or Light-Emitting Diode (LED) display 34. Such LED and OLED displays are typically used in head mounted displays in which graphics are overlaid over the real world background observable through the LED display, but in this instance the display is use as a shutter during image capture operations of the device apparatus 1. The LED display is designed such that it may be operated as a shutter to block light that entering the fisheye lens or alternatively to allow light to enter the fisheye lens. Additionally, the LED may be operated as a visual display. It is known to those skilled in the art that addressable LED, LCD, DLP, or SLM's may be used interchangeably in the present invention as shutters or a display in the present embodiment.

Optionally, as depicted in FIG. 11b the LED may be covered with a micro-bead lens 43 array to capture imagery of certain coverage. In such an instance the lenticular micro-bead array 43 is positioned over the exterior surface of the LED 34. Images captured are transmitted through lens array 43, through the LED 34, through the glass 119 of the fisheye lens 33, and then to the light sensitive surface 117 of the VLSIC 32. Lenticular beads may have a FOV that provides overlapping field of view coverage from multiple points of view about the sensor. The overlapping coverage facilitates stereoscopic display of images played back for display. Alternatively, narrow FOV lenticular beads may be incorporated to render images with little or no distortion. The outer curved side 124 of the fisheye lens is placed adjacent to the inner curved side of the LED. Preferably, the micro-lens micro-bead array fisheye lens, LED array, and outer surface of the VLSIC are welded or adhesively secured to one another to form a single composite assembly 3. The curved inner edge 118 of the fisheye lens is placed adjacent to the light sensitive recording surface of the VLSIC. As shown in FIG. 16, playback of the foreground imagery captured by the micro-bead lenses on the opposite side of the sensor 31 S. Patent Publication No 2003/0107894 to Dolgoff cited in U.S. Patent Application Publication 2008/0030573 A1 is adopted by the present inventor and is incorporated for image capture and display in a novel, useful, and unobvious manner in the present invention. Similarly, as shown in FIGS. 12a-b, imagery captured by sensor assembly 2, VLSIC assembly 3 of apparatus 1, or from a local or remote user of electronic device is displayable on the LED covering the armature. The armature 3 may also be covered an image is used to mask the sensor from blocking the foreground FOV of the user 22. And likewise, playback of the facial imagery of the user captured by the micro-bead lenses on the opposite side of the sensor 31 is used to mask the sensor from blocking the users face 22 when viewed by an onlooker 36. The use of micro-bead lens array 43 and the use of lenticular lenses for auto-stereoscopic viewing as taught by the Guilk U.S. Pat. No. 5,724,758, the Ossoinak U.S. Pat. No. 2,833,176, and the U. capture and display LED system. Micro-bead lens array 43 with micro-beads to facilitate masking and auto stereoscopic viewing. For example, images of an onlooker 36, subject 37, and the user of the device 22 are displayed to a local and remote user on the LED 34 for the user to see during images. Imagery and text 45 is be presented to the user or an onlooker. Preferably the imagery is derived by hands free input devices such as sensor 2, eye tracking 12, voice to text recognition, sub-vocal, and neural sensing systems integrated with device apparatus 1 and consistent with the objectives of the present invention. Additionally, it has become apparent from prototype work that at night time the LED 34 may be used to illuminate the users face or the surrounding area during panoramic video teleconferencing. This is especially advantageous when sensor assembly 2 is used for eye tracking and only the visible spectrum of light is used to monitor the eyes of the user.

VLSIC drive circuitry 120 transmits image signatures from the light sensitive recording surface of the VLSIC CMOS sensor that is adjacent to the curved interior glass surface of the fisheye lens. The LED display circuitry is connected to the core VLSIC processing circuitry. The control circuitry 121 for the LED is imprinted on the side of the fisheye lens that forms a seam 35 dividing Side A and Side B fisheye lenses. Alternatively, a fiber optic imaging arrangement may replace the fisheye lens arrangement. In such an instance tapered fiber optic image conduits transmit images from their entrance end adjacent and integrated with the display to the exit end of the fiber optic image conduit adjacent to and integrated with light sensitive elements of the VLSIC. The driving circuitry is connected to the core VLSIC processing circuitry for the LED when fiber optic image conduits may be imprinted on the exterior cladding or coating between or at the edges of the fiber optic fibers. The sensor also comprises an access port 38 for input and output of data and electrical power that comes via wiring 9 or fiber optics. Non-uniform fiber optics (i.e. Fibereye™) or panomophic lenses may be integrated into the arrangement to reduce or eliminate barrel distortion of captured images by the fisheye lens. The access port 38 can also provide a conduit for heat exhaust. A fan may be located at the core 39 of the VLSIC sensor to push exhaust heat build-up. Heat sinks can also be located at the core. A hollow tube made of a metal or plastic arrangement is constructed to support the sensor. The sensor is assembled and disassembled at the seam.

In operation the VLSIC sensor 32 is driven by a local or remote user 22 operating an input device that transmits x-y-z coordinate pan and zoom information to the sensor 32. In operation the VLSIC is the input device which captures images operated upon for eye cracking to determine point of view image sampling and readout. The VLSIC operates upon the eye-tracking data and outputs coordinate yaw, pitch, and roll data to the VLSIC that defines the scene to be sampled by the ROI portion of the VLSIC. The positional data defined is operated upon by the VLSIC to activate the LED to display images or remain transparent. If an area on the LED is transparent 122 then eye tracking data on one side of the sensor is collected to determine where the user is looking, which in turn causes the VLSIC sensor to make transparent the area of the LED in the direction of where the onlooker 36 and subject 37 are located such that images in the FOV are reflected through the fisheye lens to the light sensitive surface of the VLSIC. Whenever an LED is transparent a corresponding ROI will be activated to read out the transmitted image. Multiple ROI's may be read out depending on the commands coming from the interactive input device. In this manner a remote user can pan and zoom around a live panoramic scene of a user wearing system 4a who is wearing the system apparatus 1 in another location. For simultaneous recording of the entire spherical scene a user must command the sensor 32 to leave all LED's transparent. When all LED's are left transparent an image like that shown in FIG. 24b is derived. But when only some LED's are left transparent only portions of the entire spherical FOV image are captured. Those skilled in the art will know that besides eye tracking the VLSIC sensor may be programmed to conduct region of interest sampling of the surrounding environment, such as the users face, hand gestures, an onlooker 36 or other subject 37. The active opaque LED's 123 displaying imagery are designated by arrow 40 and the inactive LED's that are transparent are designated by arrow 41, and the users view of the onlooker and subject is designated by dashed lines and arrow 42. In some instances it will be advantageous to only capture small ROI to reduce the processing power required by the VLSIC, increase processing speed, and reduce the size of the image area to be sent to reduce corresponding bandwidth requirements for sending the ROI. Additionally, the core 39 of the VLSIC sensor may include an electrical storage battery, heat sinks, wireless radio frequency transmitter, additional memory, processors, and the like. Technologies that are incorporated in building the present spherical FOV sensor described in the present invention is disclosed in US Patent Application Publications 2008/0030573, dated 7 Feb. 2008, and 2008/0007617 A1 dated 10 Jan. 2008, by Ritchey, both entitled "Volumetric Panoramic Sensor Systems".

Figure 13A:
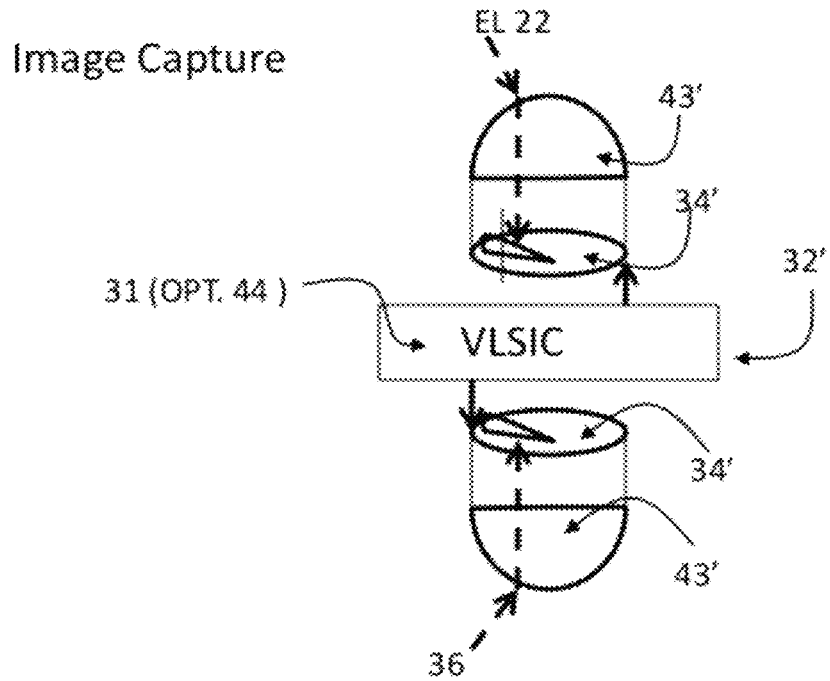
FIG. 13a is a diagrammatic perspective view of another embodiment of an integrated micro-bead camera and display used on the sensor assembly according to the present invention showing the image capture phase of operation of the VLSIC device.
Figure 13B:
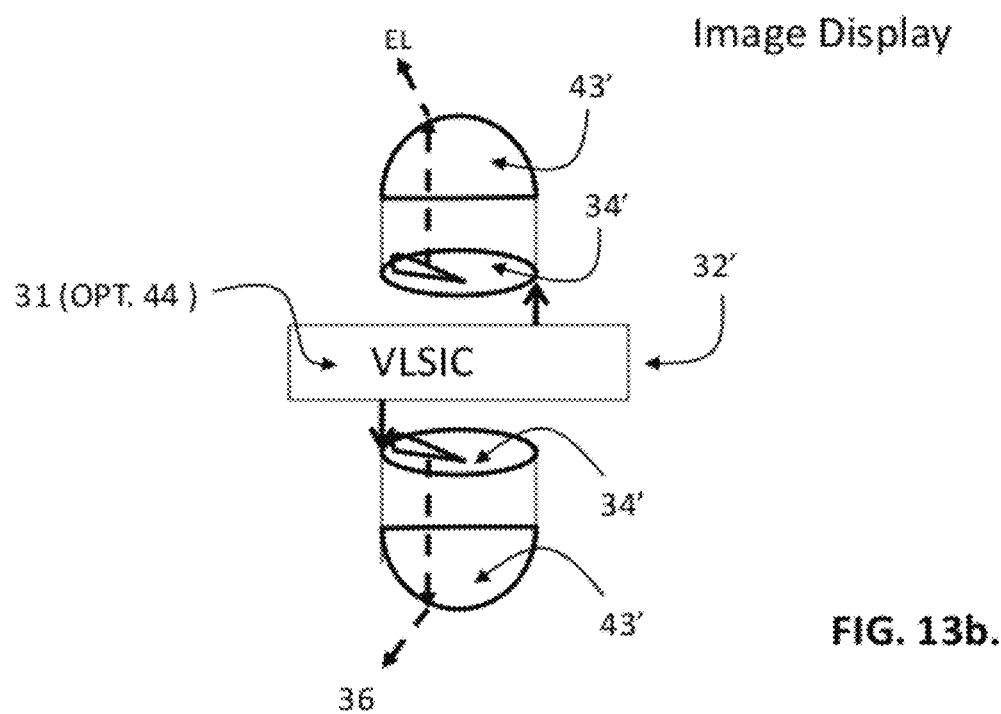
FIG. 13b is a diagrammatic perspective view of the embodiment shown in FIG. 13a which includes an integrated micro-bead camera and display used on the sensor assembly according to the present invention showing the display phase of operation of the VLSIC device.

FIGS. 13a-b are schematic diagrams that illustrates one lens of the integrated micro-bead array optic 43' and LED display optic 34' and VSLIC image capture 32'; embodiment of the invention apparatus 1. The diagram illustrates one optic that comprises the micro-bead array. In this example, the optic comprises the exterior of the sensor assembly and armature. FIG. 13a illustrates image capture. FIG. 13b illustrates image display. As illustrated in FIG. 23a-b-3, the imagery displayed is reflected to the either eye of a user 22 or onlooker 36 based on either persons viewing angle to the sensor assembly 2. In our present embodiment the sensor assembly displays imagery captured on the opposite side of the assembly so that an unobstructed view of the foreground is displayed to a user 22. Because the users eyes, designated by eye left EL and eye right, ER are at a different location than the sensor assembly, for masking purposes the image offset must be calculated so that the displayed foreground imagery in the viewers line of sight matches-up accurately with the actual real-world foreground. If required, image offset processing and calculations are determined on the VLSIC CPU processor or a remote electronic device. U.S. Pat. No. 5,724,758, dated 6 May 1998, by Gulick, Jr. and U.S. Pat. No. 2,833,176, dated 21 Jul. 1953, by A. J. L. Ossoinak entitled disclose an optical system that is incorporated into the present invention as shown in FIGS. 13a and 13b for recording and displaying imagery auto-stereoscopically. The image recorded by each optical bead is project out from the display in the same orientation it was recorded on the other side of the armature 3 and sensor assembly 2 from whence it was recorded. The effect seen by the user 22 is that the armature and sensor are masked and that a scene is displayed that blends into the real world foreground. A system with the same optical FOV coverage as illustrated in FIGS. 13a-13b is preferably incorporated into FIG. 14a and FIG. 14b to achieve auto-stereoscopic coverage of the armature 3 and sensor assembly 2.

Optionally, other integrated image capture and display systems presented found in prior art which have not been used in the novel, useful, and unobvious manner presented in the present invention may be incorporated onto the armature and sensor assembly without departing from the spirit of the present invention. For instance, U.S. Pat. No. 7,808,540, by Cok, dated 5 Oct. 2010, entitled "Image capture and integrated display apparatus"; U.S. Pat. No. 7,714,923 entitled "Integrated display and capture apparatus; and U.S. Pat. No. 7,697,053 entitled Integrated display having multiple capture devices.

Figure 4:
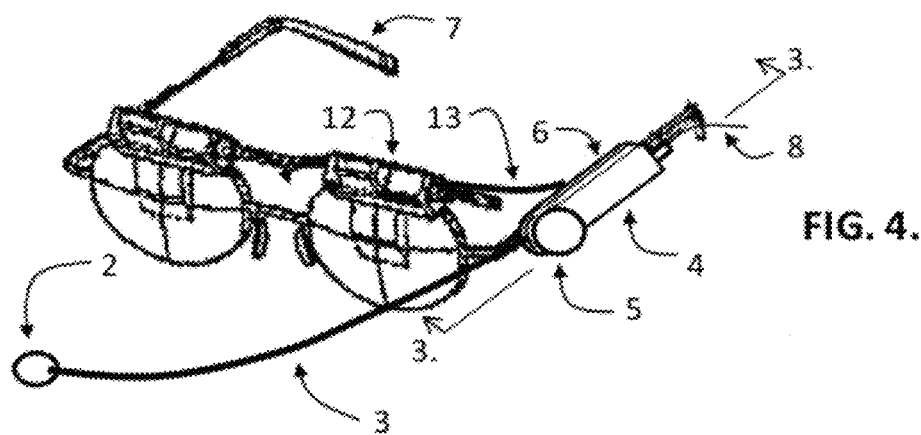
FIG. 4 is a perspective view an embodiment of the invention in which an eye tracking system is integrated into the invention to automatically raise and lower the support armature and sensor assembly in response to the field-of-view of the user.

The present invention may incorporate any one of a number of traditional eye tracking or head tracking systems to drive the operation of apparatus 1 drive the sensor assembly 2, and drive an audio-visual display in the present invention. Many navigation systems, surveillance systems and weapon systems provide a user with a video image of a region of interest from which the user may wish to designate an object or feature for tracking. The eye tracking system monitors the position of a user's eye within its socket in order to determine the user's line of gaze. The gaze information is used to control the servos dial control the position of the armature and sensor assembly by eye movements and to determine what the user is watching. A first embodiment according to the present invention incorporates a tracking system 12 worn by the user to track the eyes of the user, as shown in FIG. 4. A second embodiment in the present invention incorporates the use of the sensor assembly 2 to track the eyes of the user, as shown in FIG. 17a. From either of these eye-tracking methods data is provided to device 44 to drive the apparatus 1 or alternatively provided directly to the motors on the apparatus 1 to drive the positioning of the armature 3 with the sensor assembly 2.

One technique for monitoring the eyes of the user includes the so-called corneal reflection (CR) method in which a point light source is used to produce a bright image on the anterior surface of the cornea, and a tracking system monitors the position of the image. However such a method has been found to be very sensitive to errors induced by sensor movement. As an alternative the so-called differential CR/pupil tracking method has been developed in which the relative positions of the pupil and a corneal reflection are monitored by a suitable camera, a wavelength-sensitive beam splitter being used to ensure that the user's view is not obstructed by the light source and camera. Such a method is less sensitive to sensor movements. Generally the eye is illuminated by a near infrared source (or multiple sources) and a solid state video camera captures an image of the eye. In so-called bright pupil imaging the light source produces a light beam which is coaxial with the camera axis, and light reflected back from the retina making the pupil appear to be a bright circle, the apparent brightness increasing roughly with the fourth power of pupil diameter. In so-called dark pupil imaging the light source produces a light beam which is off axis relative to the camera axis, and a dark pupil image is produced. Real time image analysis is used to identify the pupil and corneal reflections and to find their centers.

A portable target tracking and pointing device of a type that can be incorporated into present invention to facilitate recording designation include the eye tracking system generally described above and specifically described in U.S. Patent Application 20040196433, by Durnell, dated 7 Oct. 2004, titled Eye Tracking System, and in U.S. Patent Application 20080205700, by Nir, dated 28 Aug. 2008 titled Apparatus and Method for Assisted Target Designation which includes video designation and tracking via imagery and/or directional audio. The above systems referenced in this paragraph produced information that can be digitally stored and processed by the computer of the portable wireless device 44. The eye tracking, gaze, directional FOV, distance of focus, and GPS in derived from the referenced systems described in this paragraph can be operated upon by the device 44 or directly sent to the apparatus to position the armature. Other art that may be incorporated into the present invention is the Ultra-Vis, iLeader, system developed by ARA, subsidiaries MWD, Vertek, and KAD, and other companies to include Lockheed Martin and Microvision Incorporated. The portable iLeader system includes a HMD system with a micro-laser range finder system for target designation, see through eyewear, head and eye tracking system, waveguide display googles, video cameras for recording the view the user is seeing directly ahead of where he is looking, helmet electronics, eye tracking and target designation system, voice mics and earbuds, and an associated electronics unit with to control the HMD, telecommunications network and GPS interface, iGlove, battery power and sensor feed, and a soldier augmented reality (AR) system. In the users see-through HMD of the iLeader system, the system is operated by the user to designate and record targets in the surrounding environment and overlay information on a see-through display. The overlaid information displayed to the user may be from associated sensors the user is wearing, sensors other users are wearing, or from other information on networked devices that is wirelessly transmitted from a remote location that is part of the telecommunication system and network that includes the iLeader system. Technology of a type disclosed in the iLeader system is consistent with and may be incorporated into the present invention. However, the iLeader system and none of the above systems incorporate the elements for driving an apparatus for non-interference FOV panoramic hands-free face-to-face video teleconferencing.

Figure 14A:
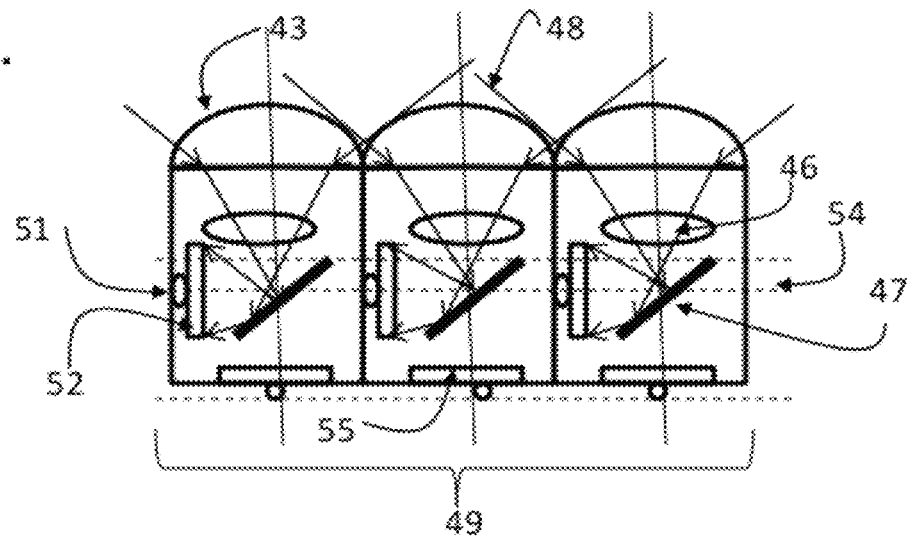
FIG. 14a is a side sectional view of yet another embodiment of an integrated camera and display used on the sensor assembly according to the present invention showing the image capture phase of the system.
Figure 14B:
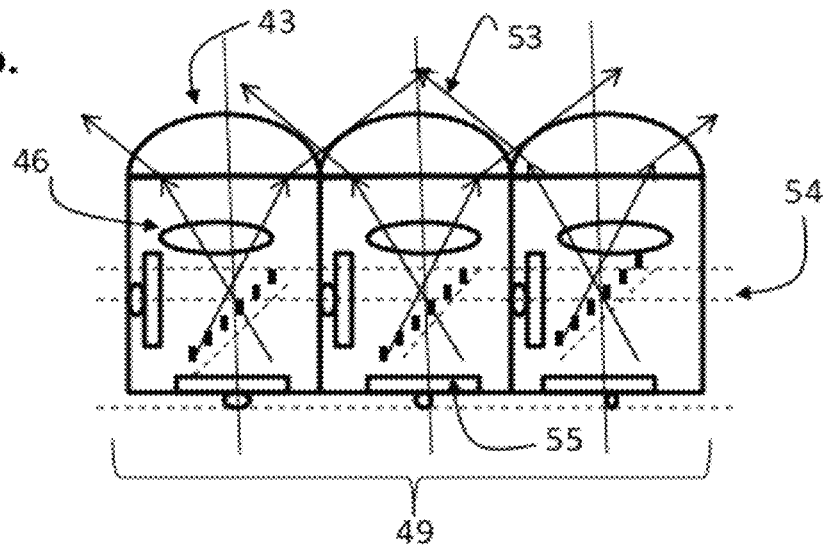

FIGS. 14a-b are side sectional views of another embodiment of an addressable ROI integrated audio-visual capture and display system compatible with the present invention. A digitally driven micro-mirror device used in the present invention for projection of a type that is used in the present invention to reflect the image is of a type manufactured by Texas Instruments Inc as a DLSP. Each photo diode 50, photo sensor 52, and micro-mirror reflector/shutter 47 are addressable by a computer electronic control assembly/CPU that is integrated into the VSLIC 31 or optionally electronic device 44. As shown in FIG. 14a, in operation a micro-mirror shutter is closed to reflect an incoming image transmitted through an objective lens and relay lens to an image capture sensor. In FIG. 14a light rays 48 from a subject image are reflected through the micro-bead lens array 43, through open micro mirror shutters, and to a photo sensor 52. Sensor 52 reads out the imagery through video drive circuitry 49 of the hose computer to the CPU of VLSIC 31 or device 44. Micro-mirror DLSP shutters are open and closed in response to commands by the VLSIC or device 44. Commands to open and close the mirrors and emit an image or capture an image are determined by the hands free input devices. Or alternatively, as shown in FIG. 14b, in operation a micro-mirror shutter is open to reflect an outgoing image 53 from an LED photo diode through a relay optic 46 and an objective lens 43' of the micro-lens array 43 to a viewer. LED 55 photo diode circuitry reads out the imagery through LED display drive circuitry 49 of the hose computer to the CPU of VLSIC 31 or device 44. Micro-mirror DLSP shutters are open and closed in response to commands by the VLSIC or device 44 to reflect an image to the eye of a local user 22, onlooker 36, or a remote user 22'. Commands to open and close the mirrors are issued through the micro-mirror drive circuitry 54 to open and close to facilitate emitting an image or capturing an image are determined by the hands free input devices. Input devices include such as sensor 2, eye tracking 12, voice to text recognition, sub-vocal, and neural sensing systems integrated with device apparatus 1 and consistent with the objectives of the present invention. The lens array 43 may be integrated into a rigid or flexible material. Integrated and adjacent the fisheye lens is an addressable transparent Organic Light-Emitting Diode (OLED) or Light-Emitting Diode (LED) display known to those skilled in the art. Such LED and OLED displays are typically used in head mounted displays in which graphics are overlaid over the real world background observable through the LED display. The LED display is designed such that it may be operated as a shutter to block light that entering the fisheye lens or alternatively to allow light to enter the fisheye lens. Additionally, the LED may be operated as a visual display. It is known to those skilled in the art that addressable LED, LCD, DLP, or SLM's may be used interchangeably in the present invention as shutters or a display in the present embodiment.

FIG. 15 is a diagrammatic plan view of the invention apparatus 1 mounted to augmented reality eyeglasses 7 and a portable electronic device 44 and illustrating the spherical field-of-view of the sensor 2. The portable device 44 includes a computer 56 for operating the portable device and hosting the panoramic support device apparatus 1. The electronic device includes a transceiver 58 and antenna 57 for connecting wirelessly to a mobile telecommunications network. The electronic device also includes a portable battery 59 to provide electrical power to the mobile electronic device 44. The panoramic support device apparatus 1 is worn by the user 22 to simultaneously record the face of the user and the surrounding environment thus enabling mobile face to face panoramic video teleconferencing. The armature 3 is of a length that enables the positioning of the sensor at a distance from the face of the user that continuous FOV coverage is achieved. The lines 60 indicate the dead space between the objective lenses where no imagery is recorded. The lines of overlapping coverage and minimal focus distance is a function of the objective lenses incorporated in the present invention. The overlapping of the FOV of the adjacent objective lenses is indicated by lines 61 in the diagram.

FIG. 16 is a plan view of the invention apparatus 1 mounted to a support 7 worn on the head of a user and illustrating the spherical field-of-view (FOV) coverage of the panoramic sensor 2 to the users face when in lowered to the forward position.

FIG. 17a-c is a perspective view of the eye-tracking embodiment of the invention. In the illustration the prime notation indicates camera recorded imagery versus real world imagery. In FIG. 17a the invention apparatus 1 is mounted to the users eyeglasses 7. As shown in FIG. 17b the sensor assembly 2 is blocking some of the high resolution vision cone FOV 42, which corresponds to the users vision cone for high ocular acuity and fine focus. FIG. 17c illustrates the scene recorded by sensor 2 which includes two back to back 190 degree fisheye lenses and their associated image sensors in the present example. The resulting hemispherical images. The sensor assembly 2 records imagery of the EL or ER of the users eyes and processes the imagery in computer 56 of the host portable electronic device and determines the coordinates of the users view. The derived coordinates of the view of the user 22 are operated upon by ROI processor in sensor assembly 2 to sample out ROI imagery corresponding to the users focus. The ROI imagery sampled corresponds to the high resolution vision cone 40 in the eye of the user. The imagery from the sensor is operated upon additional processors to mask the sensor assembly 2, move the armature 3 out of the high resolution vision cone FOV of the user, or sample imagery out for face-to-face panoramic video teleconferencing, interactive gaming, or video logging applications. In the illustration the prime notation indicates camera recorded imagery versus real world imagery.

Figure 18A:
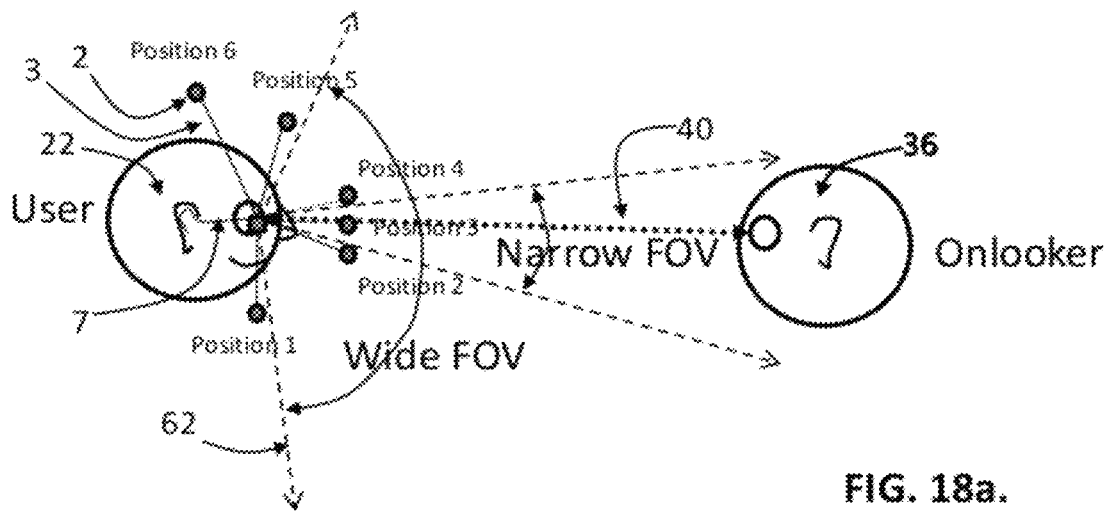
FIG. 18a is a side view diagram illustrating the field of view and the armature and sensor positions available to the user operating the present invention.
Figure 18B:
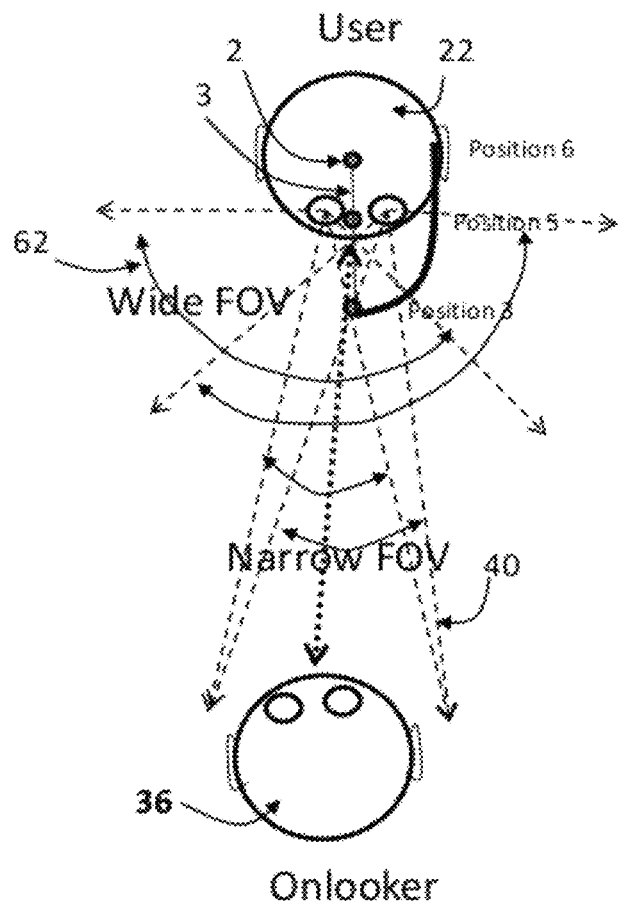
FIG. 18b is a plan view diagram illustrating the field of view and the rotation of the armature and sensor at positions available to the user operating the present invention.

FIGS. 18a and 18b are a side and plan view diagrams respectively illustrating the FOV and the armature and sensor positions available to the user operating the present invention. The armature 3 and sensor 2 are either manually adjusted or interactively adjusted to the preference of the user 22. Alternatively the user may be located remotely and control the position of the armature and sensor by sending electronic commands to the host device 44 and device apparatus 1 over a telecommunications network. Positions 1 through Position 6 illustrate various locations the user may rotate the armature 3 and sensor assembly 2 within his or her Wide FOV 62 or Narrow Field of FOV 40 or completely outside the FOV. The sensor assembly may be rotated to Position 6 over the users head and outside the users FOV to record the area surrounding the user. Or alternatively, the user may rotate the sensor assembly to Position 1 to store the sensor assembly outside the FOV of the user. To interact with the surrounding environment it Position 4 or Position 2 are preferably selected as they are outside the fine field-of-focus 40 of the user 22, but still keep the sensor in a position to track the users eyes and record the face of the user in order to conduct mobile face-to-face 2-way panoramic video teleconferencing. Position 3 is inside the narrow field of view 40 of the user and the armature and sensor assembly will block the users view of the foreground unless masked in some manner. It should be noted that the extendable and rotatable portion 66 of the device apparatus 1 may be constructed to step to specified positions or to any position along the rotation path.

Figure 19:
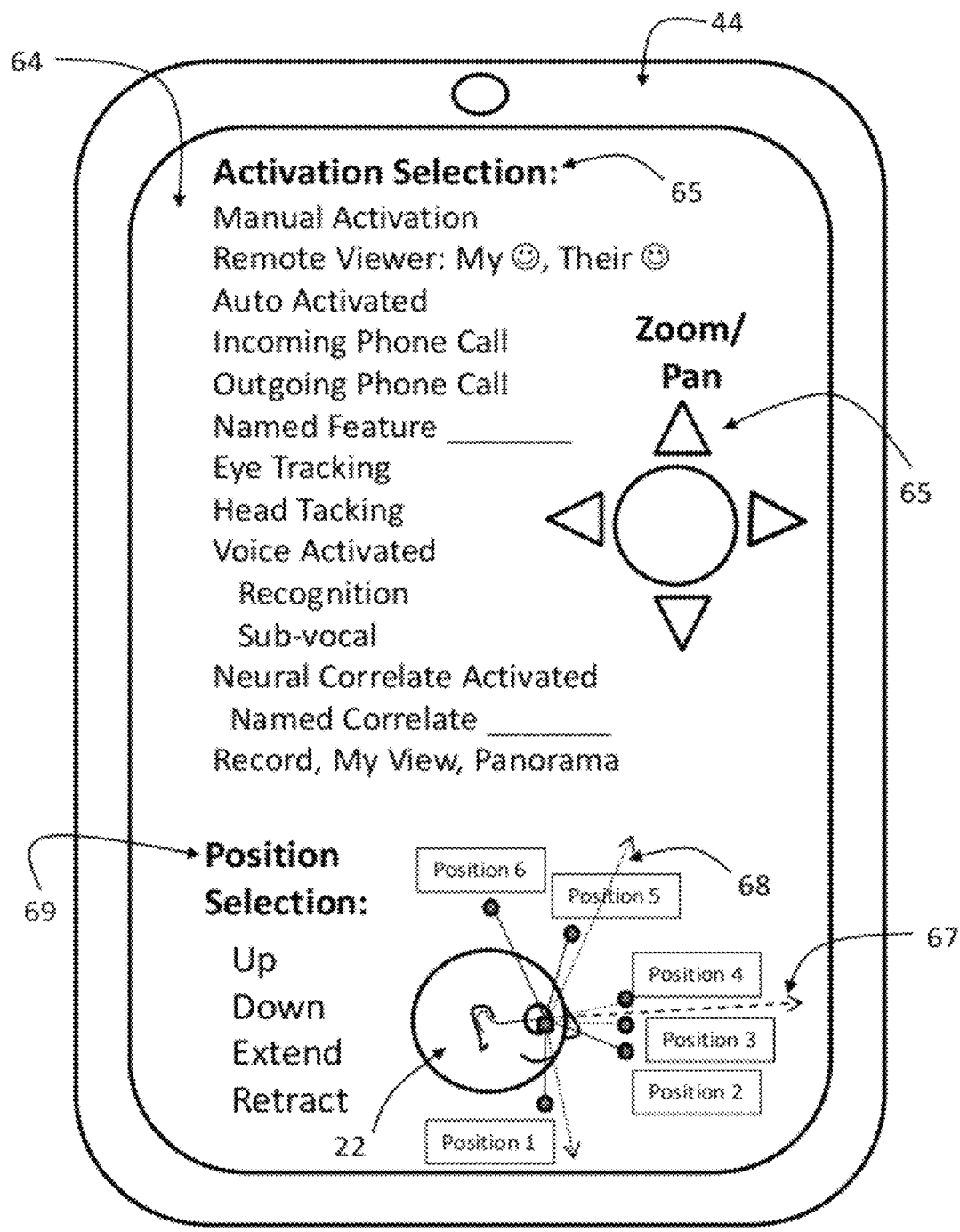
FIG. 19 is a screen shot of the user display screen on a host digital communication device (i.e. an iPhone) acted upon by the user to control the armature and spherical sensor and content thereof according to the present invention.

FIG. 19 is a illustration of a screen shot of the graphic user interface (GUI) 64 of on a host digital communication device 44 (i.e. an IPhone) to be acted upon by the user 22 to interactively control the rotatable armature and spherical sensor and content thereof according to the present invention. The graphic user interface includes a menu screen entitled "Activation Selection" 65 feature the user manually selects by using a touch screen to set the parameters of the device apparatus. The interface 64 also includes a "Position Selection" 69 feature the user manually selects by using a touch screen to set the parameters of the device apparatus 1. A dotted line 68 is used to indicate the wide FOV of the user 22. A graphic of the face of the user 22 and the sensor assembly 2 in various positions is provide on the GUI to assist the user in making his sensor assembly position selections. A dashed line and arrow 67 indicates the center point of the user 22 fine vision cone 40. The user issues commands to device 44 to set position parameters of the armature 3 with sensor assembly 2. Preferably, the user set the position of the armature with sensor assembly so that it is just below or above his or her fine vision cone in front of his face. Also, preferably the user sets the proximal end of the armature with sensor assembly at a distance that optimally accommodates his or her near FOV focus so that the user can read text or focus the graphics or imagery on the display 112 if a display is mounted on the armature or sensor assembly. Once the user sets the parameters the device will automatically adjust the support device 1 to the settings of the user whenever the device is activated. FIG. 29*a* illustrates the system being set so that the user may look down to read the display 112 at D1, and then glance up to view subjects at distance D2 in from of the user at the mid and far FOV in focus. The options are listed on the touch screen and the user interactively selects them. When the user touches a topic and it changes from red to green the application is activated. By touching the application again the topics text turns red and the application is turned off. Multiple related functions may be selected to enable or disable applications that run simultaneously. The user has the option to select options which make operating the device in a hands-free manner. In some applications like "Named Feature" or "Named Correlate" a database of features or correlates that are searched upon to drive the rotatable portion of the device apparatus 1 is required to be texted into the GUI in order for the application to function. The GUI also includes "Zoom" and "Pan" 65 functionality. The user presses the arrows on the touch sensitive screen of the device 44 to pan the spherical FOV scene, or presses the center button to zoom in and out on an item. Alternatively, the operation of the user interface be done hands free using the voice recognition system, sub-vocal recognition system, hand or facial gestures, or the brain activity sensor system.

Figure 20:
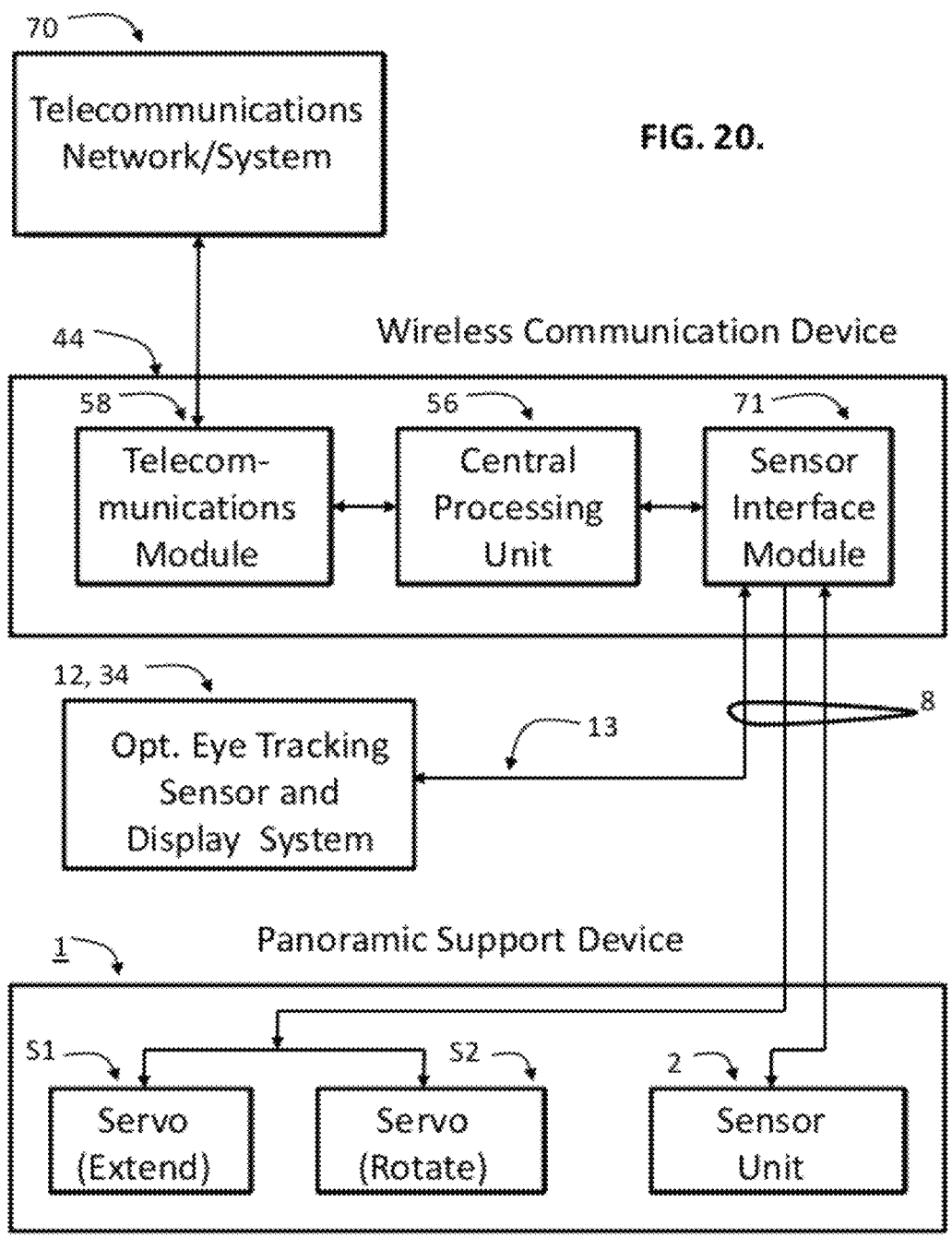
FIG. 20 is a block diagram of the interaction of the components of the present invention that interactively raise/lower, extend/retract an armature and sensor for mobile face-to-face panoramic video teleconferencing or data logging.

FIG. 20 is a block diagram of the interaction of the components of the present invention specifically shown in the structural details of FIGS. 1-9*b* discussed earlier in the specification. In operation an incoming or outgoing phone call over the telecommunications network 70 will activate the wake-up feature on the wireless mobile device 44. The central processing assembly 56 activates the sensor interface module 71 to extend and rotate the servo S1 and S2 respectively to position to move the extendable and rotatable portion of the device 66 of the panoramic support device apparatus 1 into a predetermined position. The position will have been predetermined by the user 22 using the graphic interface device as described in FIGS. 18 and 19. Optionally, an eye tracking sensor 12 may be attached to the device as shown in FIGS. 3 and 4. The central processing assembly 56 will also command the sensor interface module 71 to activate the spherical FOV sensor assembly 2.

The invention is operated by the user to interactively raise/lower, extend/retract an armature and sensor for mobile face-to-face panoramic video teleconferencing, teleprompting, or data logging. The spherical FOV assembly 2 operates to provide imagery and audio to the wireless communication device 44 that is operated upon by the processing assembly 56. Either the eye tracking sensor 12 or the sensor assembly 2 may be operated to provide coordinate information on where the user 22 is looking with his or her eyes. Typically the user has previously commanded the device using the GUI to move the sensor and armature out of the users fine-focus FOV. Additionally, the processing assembly 56 communicates with sensor assembly 2 to sample video from the ROI CMOS sensor to satisfy the GUI 64 settings the user has previously input into device 44. A remote user 22' may also command the device 44 of the local user 22 to send video to his or her remote device 44' should the user 22 give the remote user 22' permission to access such information of the local user 22. The user 22 authorizes the remote user 44 allows the remote user 22' remote access by granting permissions on the device 44 via the GUI 64.

Figure 21:
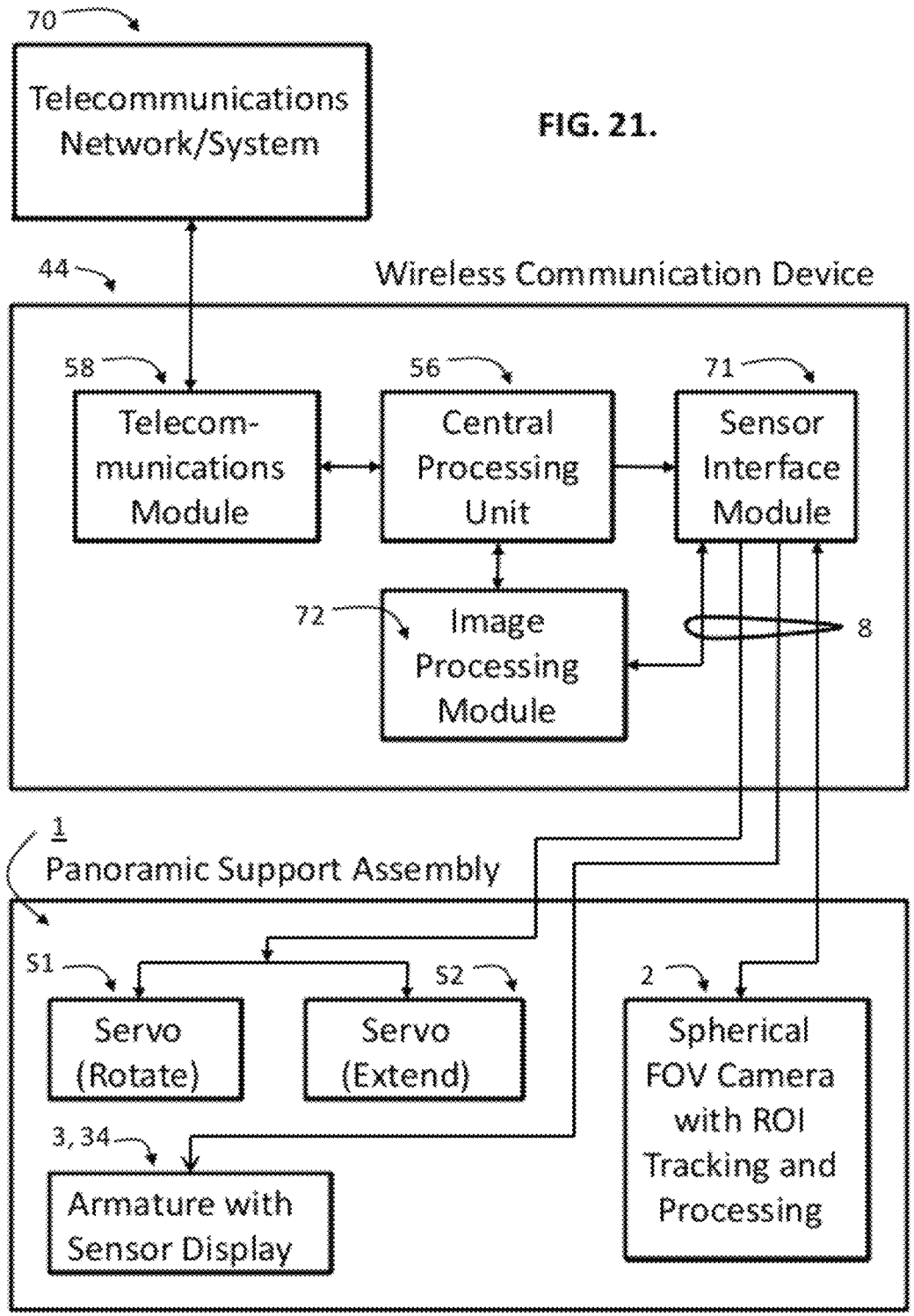
FIG. 21 is a block diagram of the interaction of the components of the present invention that provide an unobstructed view to the user operating the present invention for panoramic mobile face-to-face panoramic video teleconferencing or data logging.

FIG. 21 is a block diagram of another embodiment showing the interaction of the components of the present invention specifically shown in the structural details of FIGS. 10*a*-17*c* discussed earlier in the specification. In addition to the operation described in FIG. 20, the device apparatus 1 includes a display 34. In the present example the display 34 covers the exterior of the armature 3 and sensor assembly 2. Flexible LED and OLED of a type that may be glued or fastened to the armature 3 and sensor 2 are known to those in the flexible display industry and may be incorporated into the present invention. The LED displays foreground information processed by an image processing module 72 in the wireless communication device 44 or alternatively by processing means integrated into the armature and sensor as described in FIG. 11*a*-FIG. 17*c*. The LED is operated to provide graphic, text, image display and illumination. In this manner the panoramic support device apparatus 1 provides further structure capable of producing an unobstructed view to the user 22 operating the present invention for panoramic mobile face-to-face panoramic video teleconferencing or data logging.

Figure 22:
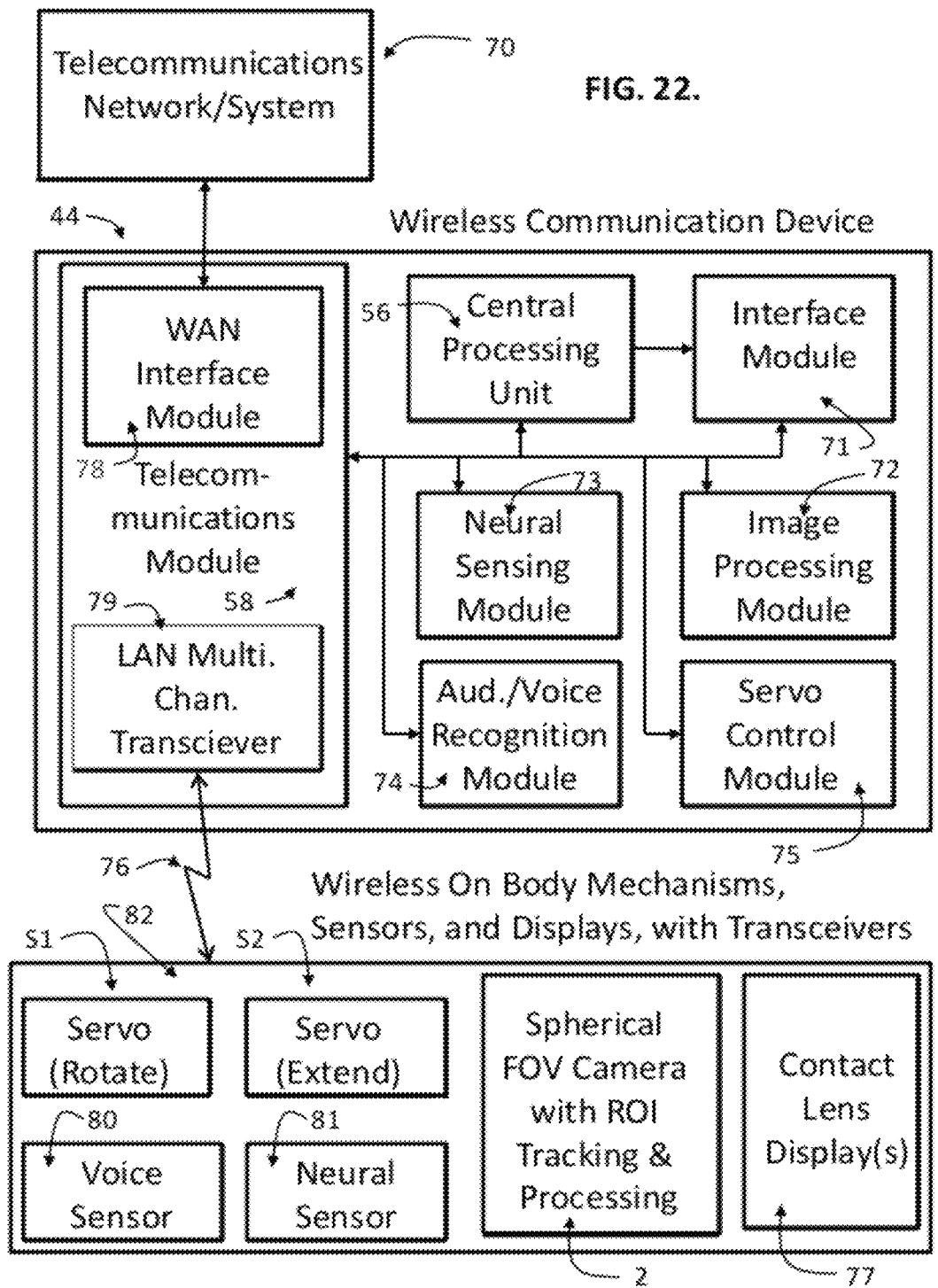
FIG. 22 is a block diagram of the interaction of the components of an embodiment of the present invention that provide command and control of the present invention.

FIG. 22 is a block diagram another embodiment showing the interaction of the components of the present invention apparatus 1 specifically shown in the structural details of FIGS. 23*a*-29*d* of the remaining specification. In addition to the operation described in FIG. 21, the device apparatus 1 includes a LAN 79 multi-channel transceiver, such as Bluetooth means, for receiving and sending a plurality of wireless data transmissions to input sensors that drive the operation of the Non-Interference Field-of-view Support Assembly for Panoramic Facial Sensor that comprises the present invention. In operation the wireless communication device 44 also includes a neural sensing module 73 for identifying neural correlates of consciousness from brain signatures; voice recognition module 74 for processing speech commands or subvocal signatures; an image processing module 72 for eye tracking, facial imaging, feature tracking, and panoramic imaging, and a servo control module 75 and interface module 71 that are centrally commanded by the central processing assembly 56. Transceiver 79 transmits data, typically by radio frequency data link 76, to the wireless on body servo mechanisms, sensors, and displays which have a built in transceiver that form the collective support assembly 82 located on the user 22 and 22'. The image processing module 72 operates upon information that is transmitted to the contact lens display(s) 77 located in or on the users eyes. The image processing module 72 operates to define the users visual FOV and subjects of interest for tracking based on information received from the spherical FOV camera with ROI tracking, display, and processing 2. Data derived from the image processing module is sent to the servo control module 75 which is in turn sent to transceiver 79. Transceiver 79 transmits the data to servo S1 and S2 to control the position armature 3 and sensor 2. Similarly voice sensor and neural sensor data is operated upon to control servos and associated armature and sensor positioning. Conflicts between sensor commands are resolved by the central processing assembly 56 or the interface module 71. The purpose of the computer processing unit (CPU) 56 is to serve as the master control system for all modules of device 44 which commands and controls apparatus 1. The arm assembly includes an electrical plug mated to couple with the socket. The armature is operated by at least one motor which turns a torque rings to move the armature. By turning the torque ring the motors can move the armature vertically to be in or outside the wearer's fine focus field of view. The modules of device 44 communicate with the CPU 56 over a bus. Device 44 includes a battery module, which supplies dc power to the computer modules.

The purpose of the interface module 71 is operates to route incoming and outgoing signals between the device 44 and on body user mounted mechanisms, sensor, and display systems with transceivers 82. It will be known by those skilled in the art that there are many tradeoffs in functionality of the invention that may be realized in firmware or hardware. For instance, the image processing module may be integrated solely in firmware resident to the CPU 56 and not include a separate processing module 72. Additionally, functionality may be divided up either on the wireless communication device 44 or integrated into the wireless on body mechanisms, sensors, and displays with transceivers 82 without departing from the spirit of the present invention. For instance ROI processing can be placed on the sensor 2, image processing module 72, or divided up on both. These are tradeoffs the designer of the system may make in tailoring the system to a particular application.

FIG. 23a and FIG. 23b1-3 are diagrammatic perspectives illustrating clipping a portion of the foreground image from the image recorded by the spherical sensor, calculating the offset, and clipping and display of the foreground image between the users eyes ER and EL on his or her head mounted, eye mounted or electronic contact lens displays such that the foreground image fills in and masks the portion of the sensor 2 and armature 3 blocking the field-of-view of the user. In the present example shown in FIG. 23a the clipped images displayed in focus on the see through augmented reality (AR) glasses of the user 22. The clipped imagery may be displayed on see through AR display systems such as head-mounted display HMD, on eye electronic contact display, or in eye implanted display system.

As shown in the diagrammatic perspective in FIG. 23b1-3 graphically illustrates the basic steps in image processing and display that occurs on the image processing module 72. Imagery recording face and eyes of the user is recorded by fisheye 24a. Foreground imagery blocked from the FOV of user by the sensor and armature is recorded by the sensor facing opposite the user, in this instance fisheye 24b. The location of the sensor is determined by photometric computer processing of the users eyes, the armature, and foreground portion of the scene shown in FIG. 24a or FIG. 24b that comprises the composite panoramic scene recorded by the panoramic sensor. The image processing module uses feature tracking firmware to determine the location of the user's eyes, FOV, sensor and armature. As depicted in FIG. 12b graphic markers 90 of various shapes, may be displayed on the LED surface to assist the target tracking system in locating the armature and sensor in space. As shown in FIG. 23b1 photometric image processing operations are performed by the image processing module to sample out the shape of imagery 2' shown in FIG. 24a or FIG. 24b in the panoramic scene that is blocked by the sensor and armature. The clipped shape imagery 2" is then interlaced into the picture signal 91 at the location the picture is being blocked by the sensor and armature. As illustrated in FIG. 23b3 resultant imagery 2''' read out for display on the eyeglasses provides and uninterrupted scene of the foreground, here the face subject 36, that is opposite the user in the local surrounding environment. Device 44 preferably operates on the image recorded by the sensor to clip images of the user's body without the background and overlays the images over the geographic information or in an appropriate space. An overlaid silhouette or a photograph of the users may be selected using an input device that is integrated with computer 4 to initiate the video teleconference.

The clipped imagery 2" and 2''' preferably comprise a live video representation of the subject during the video teleconference. A portable wireless computerized video clipping system for augmented reality overlay onto a graphic or video background of a type consistent with the present invention that may be incorporated into the present invention is was presented at the International Society for Mixed Media and Augmented Reality Symposium 2001 (ISMAR 2001) by Hirokazu Kato et al. of Hiroshima City University, Japan, kato@sys.im.hiroshima-cu.ac.jp., entitled Block Assembly in Augmented Reality. The image processing portion of the system operates to produce and readout a EL and ER image for display on the AR glasses. The foreground imagery is then over-laid on display between user and the panoramic lens and armature. U.S. Pat. No. 6,307,589 by Maguire, Jr, dated 23 Oct. 2001, entitled "Head Mounted Camera with Eye Monitor and Stereo Embodiments Thereof'; US Patent Publication 2003/0210228 A1 by Ebersole et al., dated 13 Nov. 2003, entitled Augmented Reality Situational Awareness System and Method"; and the above mentioned ISMAR2001 video teaches the manipulation of imagery recorded by sensor 2 of apparatus 1 according to the present invention. In the present invention facial and panoramic information captured by sensor assembly 2 are operated upon using the image processing of a type referenced in the above art and incorporated into the present invention for use in the augmented reality systems and for hiding the sensor as described in FIGS. 23a-25.

Figure 24A:
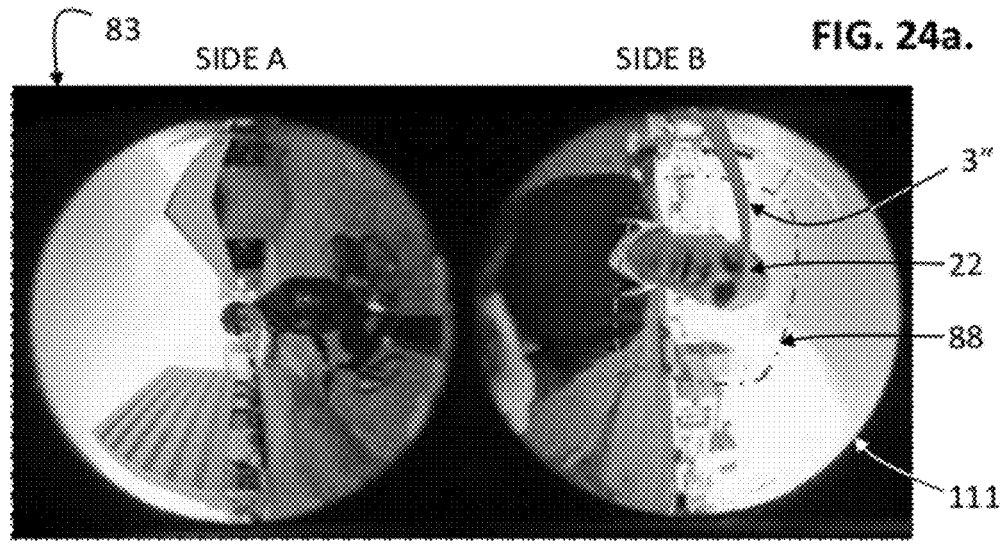
FIG. 24a is photo of the image recorded by two back to back lenses of the panoramic camera in FIG. 1 showing barrel distortion and obstruction of the users FOV and the onlooker by the support armature of the present invention.
Figure 24B:
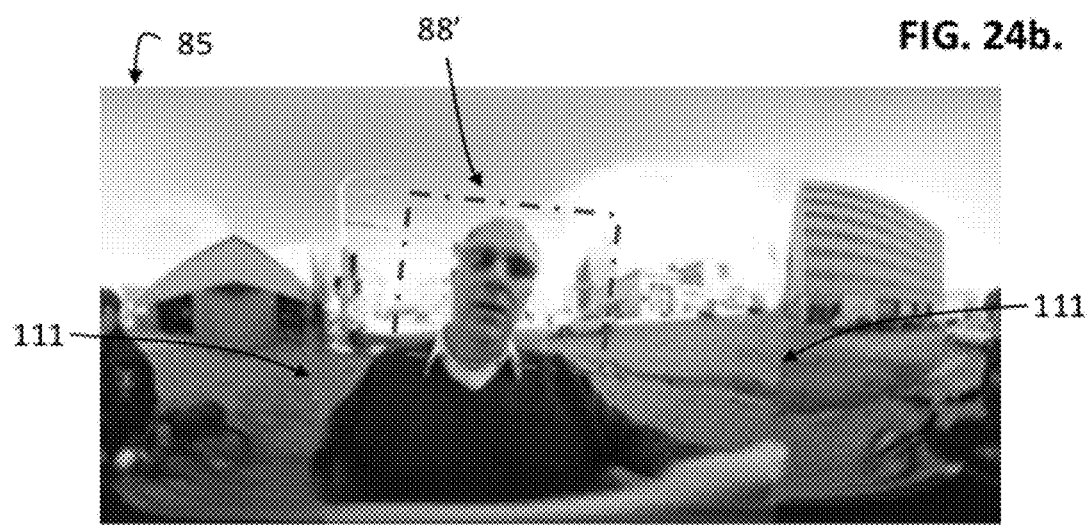
FIG. 24b is photo of the image recorded by two back to back lenses of the panoramic camera with the barrel distortion removed, oriented, and placed side by side one another; and additionally masking of the armature and sensor in the processed image presented to a remote user taking part in a 2-way face to face panoramic video phone call.

FIG. 24a is a sample of one raw video frame 83 which includes two hemispherical images Side A and Side B recorded by the two back to back fisheye lenses 24a and 24b of the panoramic image sensor 2 in FIG. 1. Barrel distortion of the two hemispherical images is caused by the optics of the fisheye lenses. The edge of the ROI 88 sampled out by the raw image 83 is indicated by a curved dashed and doted line. Obstruction of the background FOV is caused by the armature 3, as illustrated by the image of the armature 3' in the raw video frame 83.

FIG. 24b is a sample video frame 85 in which a computer system with image processing firmware has processed the image shown in FIG. 24b. The edge of the ROI 88 sampled out by the raw image 83 is indicated by a rectangle with a dashed and dotted line. In FIG. 24b image processing algorithms have operated upon the image 83 to create image 85 for readout and display to the user. In image 85 barrel distortion has been removed, the images has been translated into the proper orientation, stitched together, and placed side by side one another. Those skilled in the art will realize that computer operations to prepare a barrel distorted image for display to a user may initiated on a ROI sampled out at any time after recording a portion or the entire image depending on the design of the invention. The image processing system 72 may be further operated to remove the imagery of the armature 3 out of the background of final displayed scene shown to the user. This is done by firmware operating to interpolate the imagery surrounding the armature to replace the background scene so that the finished image in frame 85 appears to be uninterrupted by the image of the armature 3".

Alternatively, imagery captured using the image capture functionality described in FIG. 13a-b and FIG. 14a-b may be processed. In such an embodiment a portion of the imagery captured from the side of the armature facing outward from the user is sampled for insertion into the final frame displayed to the user to hide the portion of the armature blocking the FOV of the user. The resultant frame 85 illustrates the resultant image displayed to the user in which the imagery of the armature 3" is removed from the scene by interpolating and interlacing the background scene captured by the sensor 2.

FIG. 25 is a schematic diagram illustrating a two-way teleconference enabled by users operating the present invention apparatus 1. Distortion removal may be accomplished in any of several ways. In the present embodiment of the invention that uses two fisheye lenses to sample ROI 88 from the composite panoramic scene the local user 22 or the remote user 22' has interactively selected. The images are interactively selected by the target tracking the direction and distance of the FOV coordinates the eyes of the user. The image processing system 72 operates on these coordinates to sample out the image for processing and display. Algorithms which predict the direction and distance of where the user may look next may also be included in the firmware to enhance the responsiveness of the invention apparatus 1. The region of interest (ROI) 88 image sampled out may be a barrel distorted image 5 from frame 83 or from a barrel distortion corrected composite image 85 as depicted in FIGS. 24a and 24b, respectively. In the present example ROI 88 in FIG. 24a is sampled out of as raw barrel distorted image 5, and then firmware is used to remove the image distortion in ROI 88 in FIG. 24b yielding an undistorted image 7. Device 44 operates module 72 to render the undistorted image 7. In the present example the distortion is removed from image 5 solely by a computer firmware or software application program running on the electronic device 44 image processing module 72 that comprises algorithms that remove the barrel distortion from the captured image(s) and perform other panoramic image processing functions. Alternatively, distortion removal is accomplished optically by using fiber optic conduits with non-uniform magnification (i.e. a Fibreye™ arrangement). Alternatively a panomorphic lens arrangement and accompanying firmware may be used to remove distortion. It should be noted, still alternatively, designs of the system may be implemented in which objective lenses capture images with no or very little distortion, obviating the need for distortion removal optics or software/firmware. It should be noted that the image processing firmware may be integrated onto the sensor in the form of a VLSIC as shown in FIGS. 12a-12c. Any of the techniques or a combination thereof may is incorporated into the present invention to remove the distortion displayed to user 22 and 22'. The image capture device may be integrated into a traditional telecommunication network 70 and system that is designed to facilitate mobile wireless video teleconferencing.

Figure 26:
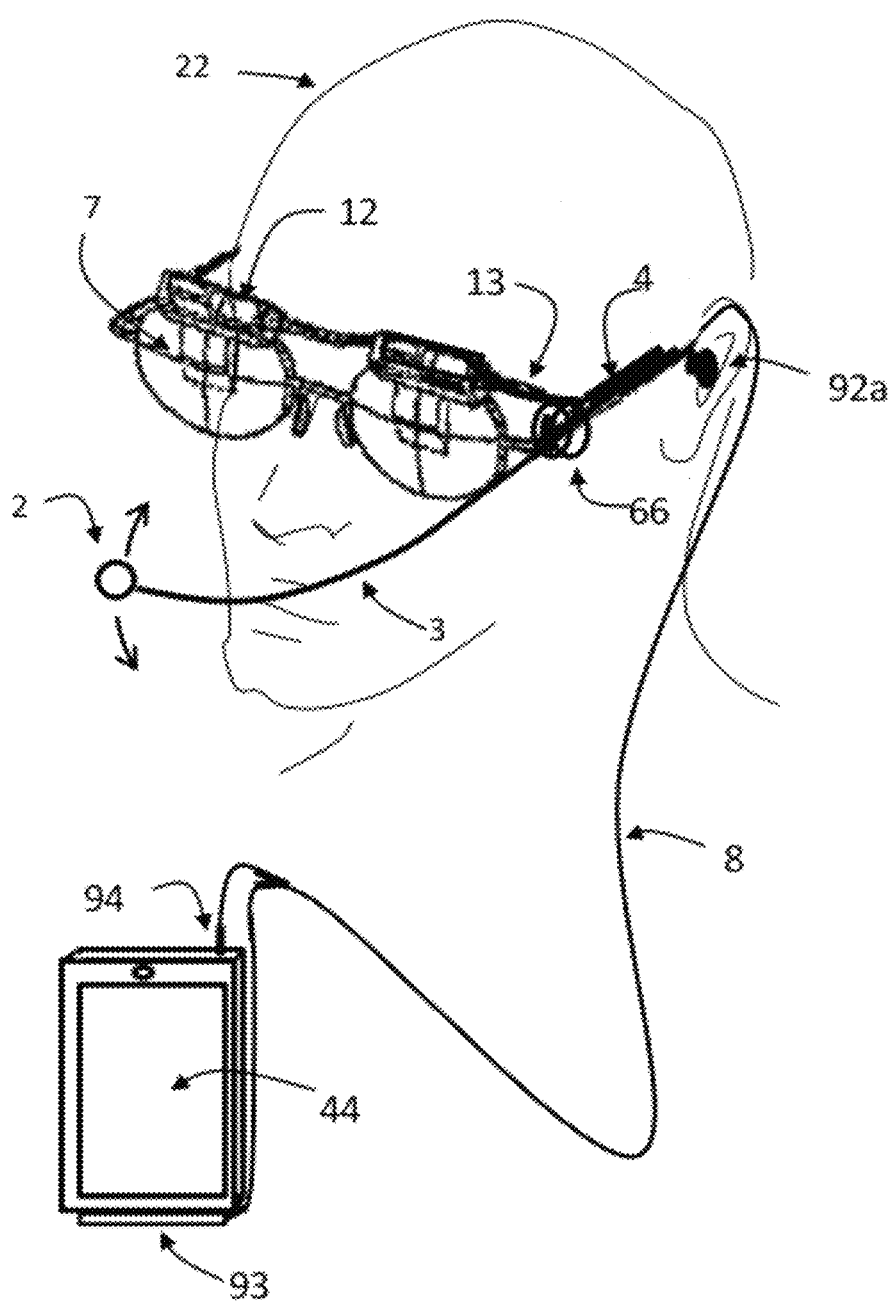
FIG. 26 is a perspective illustration of an embodiment in which the present invention is connected by cable to a host electronic device.

FIGS. 26 thru 29 illustrate several embodiments of how the invention apparatus 1 is integrated with a portable electronic device 44. FIG. 26 is a perspective illustration of an embodiment in which the present invention is connected by cable to host electronic device 44. The device 44 may be a conventional cell phone or personal digital assistant with panoramic video teleconferencing capability. A device 44 compatible with and integrated into the present invention is the iPhone 4S manufactured and sold by Apple Computer Inc., 1 Infinite Loop, Cupertino, Calif. 95014. In FIG. 26 the device 44 operates to transmit data and video signals over a standard insulated wired communication cable 8 like that described in FIG. 20 and FIG. 21. Data is transmitted to and from the support assembly apparatus 1 with panoramic sensors through a cable 8 to at least one connector that plugs into device 44. In the present example audio captured from at least one microphone located on the sensor assembly is transmitted through wiring circuitry to the 3.5-mm stereo headphone mini-jack 94 for audio input/output located on the device 44. In this manner the voice of the user 22 is captured for transmission to the remote user 22'. Audio from the remote user is transmitted in the opposite direction over cable 8 to at left and right earbud 92a and 92b (not shown) worn by the user. In this manner the voice of the remote user 22" is transmitted from device 44 for presentation to the local user 22 as illustrated in FIG. 25. Video imagery and other control data is also transmitted to and from the sensor assembly 2 and armature 3 and other sensors worn by the user through cable 8 to the to the electronic device 44. In the present example video imagery and other data transmitted between sensor 2 and device 44 is input and output over cable 8 through a 30 pin dock connector 93 located at the bottom of the device 44. Electronic devices that comprise the panoramic support assembly apparatus 1 mounted in, on, or worn by the user also communicate over cable 8 to device 44. For example, as illustrated in FIG. 20 and FIG. 26 servo S1 that rotates and servo S2 that extends the armature 3, display 34, and spherical FOV camera 2 video (including audio and imagery) and optical eye tracking sensor 12 that are in communicating relationship with device 44 are powered and commanded via transmissions over cable 8. The eye tracking sensor 12 readout and video signal input to the augmented reality display eyeglasses 7 are input and output over a standard data transmission cable 13. As previously described in FIG. 3 cable 13 includes a connector 11 at one end that plugs into housing 4 of the support assembly apparatus 1. The connector has contacts that plug into a female socket in the housing that transmit the signals from cable 13 to wires in cable 8. It will be realized to those skilled in the art that wires in cable 8 may be substituted with a fiber optic conduit communications system. A single or plurality of servo 5 are incorporated to move the armature and sensor assembly. Alternatively or additionally, the support assembly shown in FIGS. 1-2 may be designed with a manually adjustable swivel and pull out extension so that the user can adjust the armature and sensor assembly to a desired position. However, the later arrangement will mean a less hands-free operation of the invention.

Still referring to FIG. 26, wires in cable 8 may be separated out at device 44 to transmit signals for input and output as appropriate via the 30 pin connector 93 and the headphone mini-jack 94. Preferably, the cable 8 also provides electrical power to devices comprising invention apparatus 1 that are mounted in, on, or worn by the user. A portable battery may be docked with device 44 to provide additional electrical storage to power to the devices that comprise the panoramic support assembly apparatus 1. Because an objective of the device is to facilitate hands free face-to-face interaction the device 44 is preferably placed in a pocket or holster on the user 22. In operation a wake-up feature alerts the user of an incoming video telephone call and automatically positions the armature with sensor for portable panoramic video teleconferencing to commence. Likewise the user may verbally or facially interact using audio and image sensors that are part of the support assembly apparatus 1 to operate device 44 to activate the voice recognition system and a personal assistant that learns system, like the Apple Inc. SIRI system on iPhone 4s, to conduct internet searches and conduct other tasks in a portable hands-free manner. Siri (pronounced/.sup..smallcircle-.siri/) is a personal assistant application for iOS. The application uses natural language processing to answer questions, make recommendations, and perform actions by delegating requests to an expanding set of web services. Siri claims that the software adapts to the user's individual preferences over time and personalizes results, as well as accomplishing tasks such as making dinner reservations and reserving a cab. Siri was originally introduced as an iOS application available in the App Store. Siri was acquired by Apple Inc. on Apr. 28, 2010.

Figure 27:
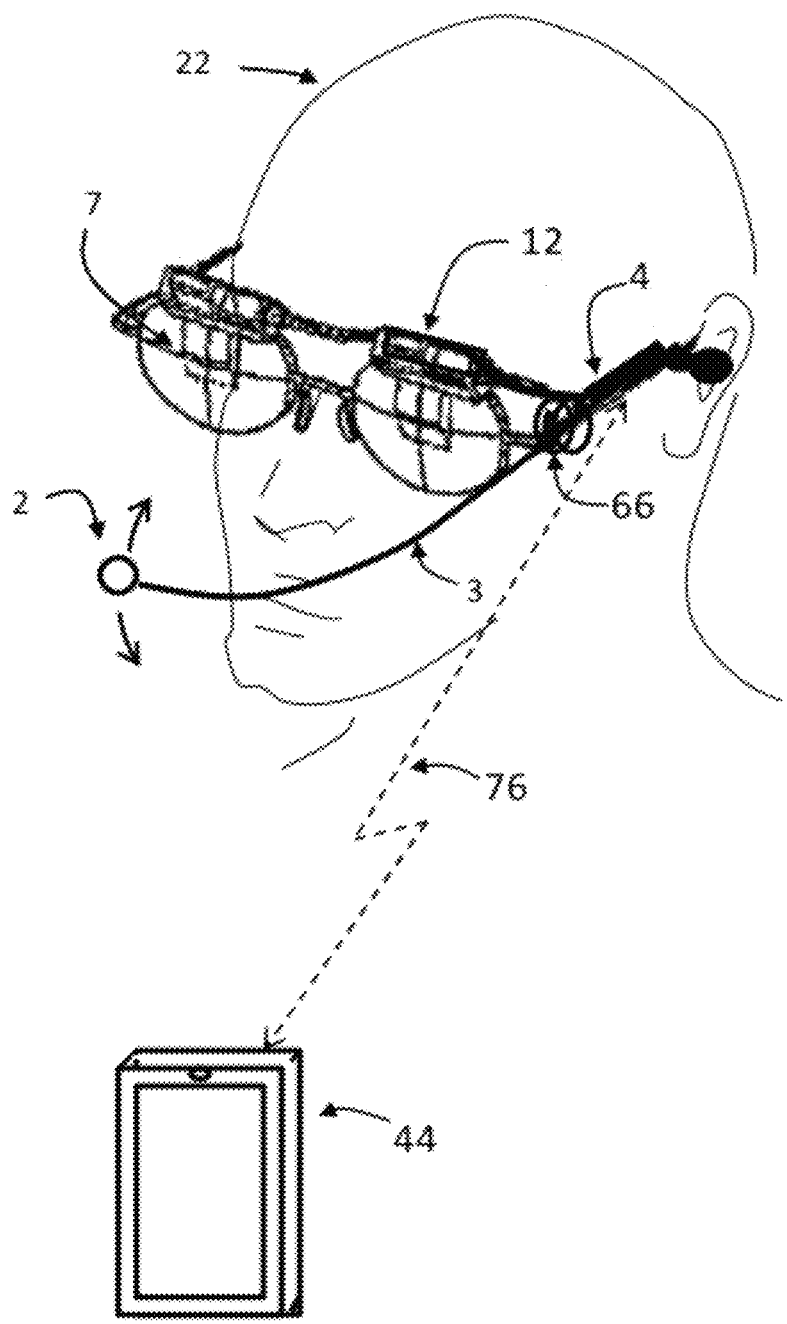
FIG. 27 is a perspective illustration of a basic wireless connection between the invention and a host electronic device.

FIG. 27 is a schematic perspective illustrating that device 44 and the panoramic support assembly apparatus 1 communicates over a cellular and wireless network. Wireless communication to the device 44 is accomplished by using the following technologies: UMTS/HSDPA/HSUPA (850, 900, 1900, 2100 MHz): GSM/EDGE (850, 900, 1800, 1900 MHz); CDMA EV-DO Rev. A (800, 1900 MHz): 802.11b/g/n Wi-Fi (802.11n 2.4 GHz only); Bluetooth 4.0 wireless technology, world phone, or the like. For example, in operation a radio frequency 76 wireless communication system 79 like that described in FIG. 22 transmits over-the-air command and control data signals between the support assemblies with panoramic sensors and audio-visual displays that comprise the invention apparatus 1. In FIG. 27 housing 4 includes a transceiver to send and to receive the radio frequency signal transmitted to and from device 44 over a WIFI or cellular connection. An incoming signal from device 44 is separated out by a de-multiplexer to command each appropriate device. An outgoing signal is consolidated and sent to device 44 after the signal from each device is multiplexed. U.S. Patent Application Publication 1007/0211148; by Lev et al, dated 13 Sep. 2007, discloses a communication system that is of a type that may be incorporated in the present invention for use in communicating between device 44 and the composite group of body worn sensors, displays, and wireless trancievers 82 in order to realize the present invention.

Figure 28A:
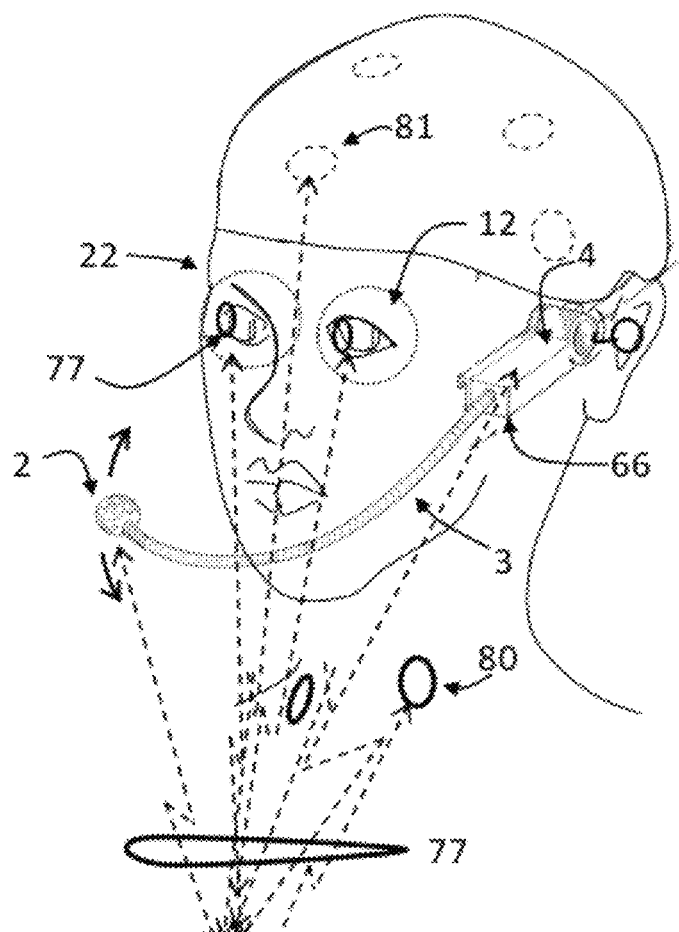
FIG. 28a is a perspective illustrating the components of a more robust wireless system comprising a portable electronic device, spherical sensor support, neural sensors, voice recognition sensors, and image sensors used for face-to-face panoramic video teleconferencing according to the present invention.

In contrast, as illustrated in FIG. 22 and FIG. 28a illustrates a multi-channel wireless connection between a portable electronic device 44 and the collective wireless on body devices 82 situated on or in the user 22. Devices 82 included worn on the user include neural sensors, voice recognition sensors, and audio-visual sensors described in FIG. 22. For example, servo S1 that rotates and servo S2 that extends the armature 3; sub-vocalization sensors 80 located on the users throat record and transmit sub-vocal signatures; neural sensors 81 record and transmit fMRI signatures, electronic contact lens displays 77 receives video imagery for display; spherical FOV camera 2 records panoramic video imagery using fisheye lenses 24 and audio using microphones 25; and conducts ROI image tracking, processing, and display from the imagery recorded by the camera 2; that are all in communicating relationship with device 44 and are commanded via transmissions over wireless link 76. Electrical power is provided to assembly 82 via batteries installed separately with each device or via wiring harness that includes circuitry that routes electrical power to each device of that makes up each of the devices that comprise the worn support assembly 82. To facilitate communication between support assembly 82 and the host electronic device 44 is preferably placed in a pocket or holster on the user 22. Assembly 82 may preferably includes an input and output port, like a mini-USB or a 30 pin connector port to allow recharging and updating of firmware. The wireless on body mechanisms, sensors, and displays with transceivers 82 comprise the electronic devices worn by the user. The communication link may be a single or multi-channel transmission. If a single transmission link is used he signals are broken out into packets and routed to the appropriate device S1, S2, 80, 81, 2, and 77 that makes up the support assembly 82.

Components that are used to realize the system in described in FIGS. 22 and 28 include the following: An electronic contact lens 77 mounted on and/or inside the eye compatible for use in the present invention is disclosed in US Patent 20090189974 A1, by Michael F. Deering, dated 30 Jul. 2009, emitted Systems Using Eye Mounted Displays. U.S. Patent 20080056517 by Algazi et al, dated 6 Mar. 2008, entitled Dynamic Binaural Sound Capture and reproduction in focused or Frontal Application that is of a type compatible with and incorporated in the present invention. The Apple iPhone voice recognition system and microphone with earbud are compatible and may be incorporated to realize the present invention. Another embodiment and component of the system includes a sub-vocalization system. Sub-vocalization is the tendency of a user to silently say individual words to themselves as they read or think. Sub-vocal recognition (SVR) is the process of taking sub-vocalization and converting the detected results to a digital text-based output. It is similar to voice recognition except it is silent sub-vocalization being detected. A sub-vocalization system of a type that may be incorporated into the present invention as a component disclosed in U.S. Pat. No. 6,272,466, dated 7 Aug. 2001, by Harada, et al., entitled "Speech detection apparatus using speculiarly reflected light" and that described in the ongoing NASA Subvocal Recognition (SVR) program began in 1999, and later renamed the Extension of Human Senses program. In the NASA program muscles of the vocal tract (e.g. electromyographic or EMG) signatures are sensed by contact sensors placed on the throat (either internally or externally to the body). The signatures are read out as electrical signals which are translated by a computer into patterns recognized by classifiers as word or word components. An objective of the present system is to incorporate the sub-vocalization signatures of the user as an additional sensor input system in helping determine "neural correlates of consciousness" to the surrounding environment and as a command and control device to drive the memory enhancement portion of the present invention. Other data collection systems that may be integrated with the present logging and memory enhancement system and method include infrared and LIDAR systems. LIDAR (Light Detection And Ranging) is an optical remote sensing technology that measures properties of scattered light to find range and/or other information of a distant target. LIDAR systems can see through fog and darkness to record the shape and motion of objects in their FOV, overcoming the limitation of visible spectrum cameras. A LIDAR systems and methods of a type that may be integrated into and is compatible with the present invention are those found in U.S. Patent Application 2003/0154010 and U.S. Pat. No. 6,859,705, by Rae et al, dated 14 Aug. 2003 and 22 Feb. 2005, entitled "Method for Operating a pre-crash sensing system in a vehicle having a countermeasure system" using a radar and camera; U.S. Patent 2007/0001822 by Karsten Haug, dated 4 Jan. 2004, entitled "Method for improving vision in a motor vehicle"; and that mentioned in U.S. patent application Ser. No. 11/432,568 entitled "Volumetric Panoramic Sensor Systems" filed May 11, 2006 and LIDAR systems cited in related patent applications by the present inventor. An objective of the present invention is to provide and embodiment to the present invention which includes a LIDAR system for logging the surrounding environment. The LIDAR system may be integrated into sensor assembly 2.

Finally, still referring to FIGS. 22 and 28, software and firmware running on device 44 of a type that is incorporated into the present invention to filter data and make correlations between body sensors and external sensors signatures collected (i.e. eye-tracking sensor, voice recognition sensor, subvocal recognition emanations, brain pattern data, and panoramic video, and manual touch screen device inputs) that may be incorporated in the present invention is the disclosed in U.S. Patent 2009/0196493, dated 6 Aug. 2009, by Widrow et al entitled Cognitive Method and Auto-Associative Neural Network Based Search Engine for Computer and Network Located Images and Photographs. Hierarchical tree and relational databases familiar to those in the computer industry and artificial intelligence discipline are incorporated in the present invention to organize and retrieve information in computer 44. Widrow teaches storing input data, images, or patterns, and quickly retrieving them as part of a computer system when cognitive memory is prompted by a query pattern that is related to the sought stored pattern. Widrow teaches search, filtering techniques, pre-processing of sensor data, post processing of sensor data, comparator operations done on data, storage of data, and keying techniques incorporated into the present invention. Widrow also teaches that the computer may be part of a computer or information appliance and that the system may be remotely connected to the global information grid (GIG)/internet and the processes distributed. U.S. Patent Application 20070124292 A1, by Kirshenbaum et al, dated 31 May 2007, entitled Autobiographical and Other Data Collection System teaches a stereoscopic video logging system with recall. However, neither Widrow or Kirshenbaum teach the present invention. The correlation and filtering of multi-sensory data provided by the host of sensors systems illustrated in FIGS. 22 and 28 are operated upon in the present invention by device 44 to command apparatus 1, the sensor systems themselves, and audio-visual presentations interactively provided to the user 22.

Figure 28B:
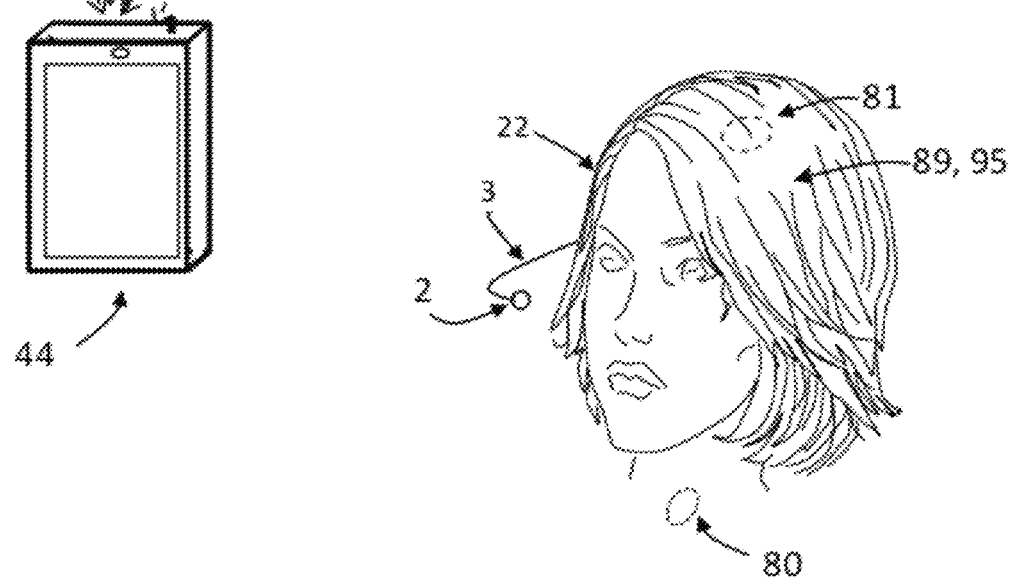
FIG. 28b is an exterior view of the user shown in FIG. 28a wearing a scull cap (disguised as a wig) with neural sensing capabilities to interactively operate/drive armature and spherical sensor worn by the user for face-to-face panoramic video teleconferencing.

FIG. 28b is an exterior view of the user depicted in FIG. 28a wearing a skull cap with neural sensing capabilities that provide fMRI readings that assist the device 44 in interactively operating and driving the armature and spherical sensor worn by the user for face-to-face panoramic video teleconferencing. A wig 95, also referred to by some as a hairpiece, that is woven into the outer side of the skull cap 89. The hair fibers and flesh colored skull cap is used to hide or conceal brain activity components of the present invention that are mounted in and on the head of the user according to the present invention. The brain activity scanning components are located between the material holding the hair and the material next to the head of the user that makes up the hairpiece. Besides brain activity sensors, other sensors and electrical components may be situated in the skull cap in accordance consistent with the present invention. Examples of portable neural sensing systems that may be used with the present invention include includes Magnetic Resonance Imaging devices such as the Atomic Magnetometer Sensor Array Magnetic Resonance (AMR) Imaging Systems and Methods. Recently portable Atomic MR systems such as those described in U.S. Patent 2009/0149736, dated 11 Jun. 2009 by Skidmore et al and U.S. Patent 2010/0090697, dated 15 Apr. 2010 by Savukov have been disclosed that are of a type compatible and enabling of the present invention. John Kitching, a physicist at the National Institute of Standards and Technology in Boulder, Colo. has developed a tiny (grain of rice size) atomic magnetic sensors of a type compatible for use in the present invention. Specifically, systems and devices disclosed in the Skidmore patent and Kitching presents a wearable portable array, of reduced size, low power consumption, reducible to a wafer-level, has rapid signal transfer, and with decreased magnetic field that facilitates lower cost and easy mounting on and/or inside a person, animal, or inanimate object. U.S. Patent Application 20100016752, by Jeffery M. Sieracki dated 21 Jan. 2010 entitled System and Method for Neurological Activity Signature Determination, Discrimination, and Detection discloses a system for automatically correlating neurological activity to a predetermined physiological response comprising: at least one sensor operable to sense signals indicative of the neurological activity; a processing engine coupled to said sensor, said processing engine being operable in a first system mode to execute a simultaneous sparse approximation jointly upon a group of signals sensed by said sensor to generate signature information corresponding to the predetermined physiological response; and, a detector coupled to said sensors, said detector being operable in a second system mode to monitor the sensed signals and generate upon selective detection according to said signature information a control signal for actuating a control action according to the predetermined physiological response.

FIG. 29a is a diagrammatic perspective illustrating another embodiment of the support device apparatus 1 in communicating relationship to electronic device 44. This embodiment comprises a electronic device adapter system 96 for capture, transmission, and focusing a displayed image onto the image sensor 97 of the electronic device 44, like an I Phone.

FIG. 29b is a plan sectional view of the sensor assembly 2 depicted in FIG. 29a that records audio and image signatures of the surrounding environment. Two objective lens systems OL1 and OL2 transmit images through objective lens 24a and 24b to relay optic 100a and 100b that transmit the images off axis through focusing lenses 101a and 101b to an HD image sensor 26. The relay optics may be mirrors, prisms, or fiber optic image conduits. Optionally a non uniform fiber optic image bundle known as "Fibreye", or a panamorphic lens arrangement, may be positioned in the optical path either in the sensor assembly 2 or adapter 96 to reduce barrel distortion introduced by the fisheye lenses 24a and 24b. The image sensor 26 may comprise a VLSIC that incorporates ROI processing. Referring to FIG. 24a, in such an instance the sensor may read out the entire HD image 83 or a portion of the image 88 for processing additional processing or display. The VLSIC may also include panoramic image processing and other image processing applications coded into the VLSIC firmware, such as distortion removal, image stitching, orientation correction, scaling, feature tracking, and vibration correction. For example, referring to FIG. 24b, if distortion is removed the image 85 or 88' may be read out. Preferably, the VLSIC is a FPGA type that may is dynamically programmable such that it responds to commands interactively commanded issued in real time by the user operating device 44. The image from the sensor is read out to a high intensity display 102. The image displayed on the display side of the high intensity display 102 is oriented such that the displayed image is then imaged through focusing lens optics 103 to the entrance end 104 of a fiber optic imaging bundle 105. The focused image is then transmitted through the fiber optic imaging bundle 105 to the exit end 106 of bundle.

FIG. 29c is a side sectional drawing of the electronic device shown in FIG. 29a with an attached electro-optical adapter system for capture, transmission, and focusing a displayed image onto the image sensor of the electronic device 44, like an IPhone 4S or iPhone 5. As depicted in FIG. 29b this is accomplished by sensor 2 capturing the image and then transmitting the image to a display for projection onto the image sensor of the device 44. And adapter assembly housing holds the display and relay lens assembly in communicating relationship to focus the displayed image onto the sensor of the electronic device 44. The focused image at the exit end 106 of the bundle 105 is then transmitted through relay optics 107 and adaptor lens optics 108 through the camera optics 109 in focus to the image sensor 97 of device 44. A high intensity display 102 of a type compatible with the present invention is typically used in video projection systems. A very bright HDTV display system compatible with and integrated by reference into the present invention manufactured by Microvision of Redmond, Wash., includes the small portable Integrated Photonics Module (IPM) only a couple of centimeters square or a DSLP display manufactured by Texas Instruments for use in HD video projections systems. A high intensity display chip is preferred in order to compensate for the loss of light intensity when the image is transmitted through the clad fiber optic imaging bundle 105.

Referring again to FIG. 29b, miniature microphones 25a to the ninth record audio signatures and transmit them through wiring 98 that runs through cable 8 that transverses support armature 3. The microphones are connected by circuitry located in the sensor assembly support housing 99 that is supported by armature 3. All components that comprise the sensor assembly 2 are held in place by support housing 99. The housing is may be constructed of hard plastic, metal, or any suitable material. Electronic devices that comprise the sensor assembly 2 are powered electrically from power transmitted through cable 110 and circuitry originating in device 44. Cable 110 functions to not only carry electrical power to devices in the sensor assembly 2, but to also power other devices that are part of the support assembly, like servo S1 and S2, the display integrated into the sensor head, or other electronic devices worn by the user. Battery packs and other peripheral devices may be attached to device 44 through the connector 93 in order to enhance the operation and functionality of the support device apparatus 1.

FIGS. 29a and 29b also illustrate an additional embodiment of the support assembly in which a rectangular LED or OLED display 112 is placed on the armature for near field of view display. Optionally, near field of view optics are placed between the eyes of the user and the display to enlarge and focus the image displayed. In operation the user looks over the armature, sensor, and display to view subjects in the mid and far foreground, and may glances down to view the display 112 mounted on the sensor assembly 2. Focusing on the armature display by the user is accommodated by the user wearing his or her close field-of-view contact lens in the eye on the side the display is located. Still alternatively, focusing on the armature display may be accommodated by the user looking through the bottom portion of his or her eyeglasses which are typically for near field of view if the glasses are of a bi-focal or progressive lens design. In the optical arrangement shown in FIG. 29a the display is hidden from the FOV coverage of the back-to-back fisheye lenses. This is because the display is within the parallax area where the two fisheye lenses have adjacent field of view coverage 111. This design allows the display not to interfere with the panoramic image captured. Optionally, the LED or OLED display 112 are constructed with see-through display material. The see-through display may be either attached on the sensor assembly 2 or armature 3. The display is attached such that it may be looked thorough by the user such that graphics and images may be overlaid over the real world scenery on the other side of the display 112.

FIG. 29d describes a final embodiment of the adapter assembly 96. In this alternate adapter assembly design 96' the image signal from sensor 102 is transmitted over wire 116 through cable 8'' to HD display 115. The image on display 115 is then optically transmitted through adapter lens assembly 108 through the camera lens 109 to the image sensor 97 in focus of the portable wireless device 44. Optionally a non uniform fiber optic image bundle known as "Fibreye" 113 arrangement, may be positioned in the optical path of the adapter 96' to reduce barrel distortion introduced by the fisheye lenses 24a and 24b. Electrical power is supplied to the display 115 and other devices that require electrical current to operate via cable 110 that connects to device 44. Optionally, a battery is integrated into the support assembly to provide electrical power to devices that comprise support assembly apparatus 1.

Figure 30A:
FIG. 30a-d are perspective illustrations of various applications of the invention.

FIG. 30a-d are exterior perspective diagrams that illustrate several novel embodiments of the panoramic support that form support device apparatus 1. FIG. 30a illustrates an embodiment in which the invention is integrated into an electronic communication device entirely worn on the users head. In this arrangement all components of device 44 are integrated into the head worn support structure in a standalone manner.

Figure 30B:

FIG. 30b is an exterior perspective where a cap includes the head mounted components comprising the present invention. Objective lenses are mounted on the vamp of the cap to capture the users face while simultaneously while other objective lenses face outward to capture imagery of the surrounding environment. Sensor assembly 2 may be mounted on armatures that swing down from the vamp of the cap to capture the users face and foreground, or over the top of the cap to capture the foreground and background. A plurality of armatures may be used in order to capture stereoscopic imagery of the users face and surrounding environment. Alternatively or additionally, objective lenses may be mounted on the objective lenses may be mounted in the brim of the cap to capture imagery of the surrounding environment. In this arrangement portable communication, camera, audio, and AMR or fMRI and processing system are integrated into the outer material of the crown, vamp, brim, and ear flap of the cap. The cameras and microphones mounted on the cap may be very small such that the cap appears to be of a conventional nature, thus not drawing inordinate attention and being accepted by the wearer and person's in the surrounding environment. Cameras associated with the objective lenses visible on the outside of the cap are supported and concealed in the interior body of the cap. An eye tracking camera or cameras are located in the bill or brim of the cap. The AMR sensors systems extend around the head such that they surround the brain as previously described in FIGS. 28a and 28b. The flap of the cap may include an opening for the ear. Optionally, the head worn device also includes a eye-tracking, head position sensor, optional target designator, throat microphone, subvocalization sensor sensors, and optional in hat electronics such as processing systems, head worn control electronics and adjustment features. A cable located at the back of the cap connects to device 44 or a portable computer located in the users backpack. The cable may be used to provide electrical power and input/output data to and from the host computer and head worn device that includes the AMR sensors, camera sensors, and head mounted display device.

Figure 30C:

FIG. 30c illustrates an embodiment of the invention in which the sensor flips up from the belt of a user. The integrated audio-visual sensor capture device simultaneously records a contiguous surrounding spherical scene. The sensor capture device is on an armature that flips up from a housing attachable to the belt buckle of the user. Located within the housing is an electronics assembly for driving the audio-visual capture device, telecommunication electronics, and battery storage means to power the electrical components of the head-worn system. The electronics assembly connects to and is in communication with a head-mounted display device. The device may communicate by a wire, fiber optic, or wireless connection. The electronics assembly includes firmware or software for tracking the head and hand position of the user. The support arrangement may be used to illustrate an interactive gaming application. Data from the sensor is operated upon to drive an interactive computer game that is displayed on the users head mounted display device. The image generated for display is affected by the users head position. For instance, if the users head is turned to the left, the users display responds by panning the scene to the left as the user moves his head. Hand movement is also tracked to affect the game. For instance, if the user moves his trigger finger a simulated gun is fired in the game. The user may also use the device for telecommunication. Hand gestures may be used to control the device. Connectivity between the electronics assembly and the head-mounted display device may be by wire, fiber-optic conduit, or wireless. Wireless connectivity and communication may be by traditional cellular telephone and Bluetooth connectivity.

Figure 30D:
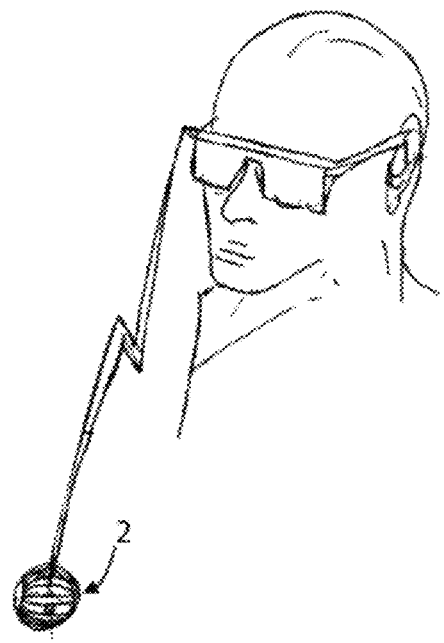

FIG. 30d illustrates an embodiment of the invention in which the sensor is unplugged from an armature or charging assembly as described in FIGS. 10a, 10b, and 10c and used remotely. The sensor 2 capture device that simultaneously records a contiguous surrounding spherical scene. The sensor capture device is enclosed in a user positional spherical housing. Located within the housing is an electronics device 44 for driving the audio-visual capture device, telecommunication electronics, and battery storage means to power the electrical components. The device is designed to communicate using traditional cellular telephone and Bluetooth connectivity. The device may communicate with the in eye, on eye, or head mounted display. In operation the user positions the sensor in a nearby location and commands the electronics assembly 44 to receive and transmit audio-visual information derived from the sensor.

Additional applications envisioned by the present inventor and within the scope of the present invention include using the support assembly data logging life experiences of a user or another person the user is associated with; reality movie and television production; security; marketing, education; and health care. Specifically, facial analysis application firmware and hardware that read a user or bystander's mood, interests, and vital signs may be integrated into the invention. In such an embodiment facial data gathered by sensor assembly 2 is transmitted to mobile device 44. Device 44 would perform standalone analysis on the information or transmit the information to a remote location for analysis, additional processing, or storage. The information yielded by the analysis is then acted upon or logged for future reference. Finally, the present invention will enable on-the-move panoramic hands-free face-to-face interaction between people and machines allowing people to perform tasks that cannot be performed currently required to hold a mobile device in ones hand while communicating on the move. For example, simultaneously recording a person's face and body who is riding a bicycle and observing what they are responding to in the surrounding environment. Or simultaneously having a face-to-face telepresence conversation with a person in order to assist him while his or her hands perform an emergency medical procedure, like CPR.

Those skilled in the art will know, or be able to ascertain using no more than routine experimentation, many equivalents to the specific embodiments of the invention described herein. These and all other equivalents are intended to be encompassed by the following claims.

The invention claimed is:

1. A head-mounted non-interference field-of-view apparatus comprising:
   a support housing for supporting the apparatus on a head of a user;
   an eye tracking system configured to determine a field of view of the user;
   a field-of-view sensor assembly including:
      a sensor housing;
      a camera system mounted within the sensor housing, the camera system having a plurality of objective lenses facing outward and configured to provide continuous field-of-view coverage of a foreground scene, the camera system being in visual line of sight to at least one eye of the user; and
      a display device facing towards the user;
   a support armature integrated with the sensor assembly and connected to the sensor assembly at a distal end of the support armature and the support housing at a proximal end of the support armature;
   circuitry configured to communicatively connect the camera system to a portable digital device;
   at least one actuator attached to the support armature, the at least one actuator being configured to shift the sensor assembly between a deployed position forward of the user's face and an alternate position, the at least one actuator being responsive to command and control signals from the portable digital device and the sensor assembly such that the camera system is moved forward of the user's face when a hands-free panoramic video telephone conversation is initiated; and
   an image processing system for operating on field-of-view imagery provided by the camera system for determining a location of the sensor assembly and an offset between the user and the sensor assembly, the image processing system being configured to modify the field-of-view imagery according to a shape of the field-of-view sensor assembly, the display device being configured to display the modified imagery so as to mask the support armature and field-of-view sensor assembly between the user's at least one eye and the foreground scene such that the support armature and field-of-view sensor assembly are hidden and do not block the user's fine focus field-of-view.

2. The apparatus according to claim 1, wherein the portable digital device includes a personal digital assistant being configured to:
- learn preferences of the user over time and personalize results according to the preferences;
- use natural language processing to answer questions, make recommendations, and perform actions by delegating requests to web services;
- provide panoramic video teleconferencing capabilities; and
- provide a touch screen graphic user interface to facilitate defining system parameters for manual and automated command and control of the support housing, support armature, sensor assembly, and related peripheral devices that assist in commanding and controlling the apparatus.

3. The apparatus according to claim 1, wherein the sensor assembly and portable digital device are simultaneously responsive to read out imagery for transmission and display of a region of interest of the user derived by the eye-tracking system and sensor assembly as the eye-tracking system tracks the at least one eye of the user.

4. The apparatus according to claim 1, wherein the further comprises processing means for panning and zooming around the foreground scene, displaying a graphical user interface window via the display device, or overlaying secondary imagery over the modified imagery via the display device.

5. The apparatus according to claim 1, wherein the sensor assembly further comprises at least one microphone mounted within the sensor housing and facing outward for recording audio signatures.

6. The apparatus according to claim 1, wherein the image processing system is integrated into an electronic device of at least one of a tablet, laptop, PC, head supported structure, head mounted device, eye mounted device, panoramic theater, or telecommunications system and network.

7. The apparatus according to claim 1, wherein the camera system is stereoscopic.

8. The apparatus according to claim 1, wherein the camera system comprises a spherically shaped very large scale integrated circuit (VLSIC).

9. The apparatus according to claim 1, wherein the camera system includes multiple region-of-interest (ROI) processing, tracking, and image output capabilities.

10. The apparatus according to claim 1, wherein at least one of the support armature and display includes an integrated image capture and display system.

11. The apparatus according to claim 1, further comprising a see-through electronic paper display including near-field-of-view optics, the electronic paper display being mounted below the sensor assembly and being configured to present images derived from the sensor assembly and the personal digital assistant to the user, the at least one actuator being configured to move the sensor assembly and support armature outside of a mid and distant range fine focus field of view of the user such that the display is positioned just below the fine focus field of view and within a reading distance of the user without blocking the fine focus field of view for allowing the user to look over the armature and sensor assembly to view the foreground scene, glance down to read the electronic paper display, and selectively position the support armature for looking through the electronic paper display for augmented reality applications.

12. A head-mounted non-interference field-of-view apparatus comprising:
- a support housing including at least one fastener for securing the support housing to a head of a user;
- an eye tracking system configured to determine the user's field of view;
- a spherical field-of-view sensor assembly including:
  - a sensor housing;
  - a camera system mounted within the sensor housing, the camera system having a plurality of objective lenses facing outward and configured to provide continuous spherical field-of-view coverage of a foreground scene, the camera system being in visual line of sight to at least one eye of the user; and
  - a display device facing towards the user;
- a support armature integrated with the sensor assembly and connected to the sensor assembly at a distal end of the support armature and the support housing at a proximal end of the support armature;
- a flexible cable and connector extending through the support armature;
- circuitry configured to communicatively connect the camera system to a portable digital device via the flexible cable and connector;
- at least one actuator attached to the support armature, the at least one actuator being configured to shift the sensor assembly between a deployed position forward of the user's face and an alternate position, the at least one actuator being responsive to command and control signals from the portable digital device and the sensor assembly such that the camera system is moved forward of the user's face when a hands-free panoramic video telephone conversation is initiated; and
- an image processing system for operating on field-of-view imagery provided by the camera system for determining a location of the sensor assembly and an offset between the user and the sensor assembly, the image processing system being configured to modify the field-of-view imagery according to a shape of the field-of-view sensor assembly, the display device being configured to display the modified imagery so as to mask the support armature and field-of-view sensor assembly between the user's at least one eye and the foreground scene such that the support armature and field-of-view sensor assembly are hidden and do not block the user's fine focus field of view.

* * * * *